US012682433B2

(12) United States Patent　(10) Patent No.:　US 12,682,433 B2
Pan et al.　(45) Date of Patent:　Jul. 14, 2026

(54) NOISE REDUCTION FOR LIGHTMAP

(71) Applicant: Tencent Technology (Shenzhen) Company Limited, Shenzhen (CN)

(72) Inventors: Xiaoyu Pan, Shenzhen (CN); Yuanheng Li, Shenzhen (CN); Yu Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 272 days.

(21) Appl. No.: 18/665,962

(22) Filed: May 16, 2024

(65) Prior Publication Data

US 2024/0303784 A1　Sep. 12, 2024

Related U.S. Application Data

(63) Continuation of application No. PCT/CN2023/116123, filed on Aug. 31, 2023.

(30) Foreign Application Priority Data

Oct. 11, 2022　(CN) .......................... 202211240562.4

(51) Int. Cl.
　*G06K 9/00*　(2022.01)
　*G06T 3/06*　(2024.01)
　*G06T 5/70*　(2024.01)
(52) U.S. Cl.
　CPC . *G06T 5/70* (2024.01); *G06T 3/06* (2024.01)
(58) Field of Classification Search
　CPC ............. G02F 1/13629; G02F 1/13338; G02F 1/136227; G06F 3/0412; G06F 3/04164;
(Continued)

(56) References Cited

U.S. PATENT DOCUMENTS 7,595,806 B1　9/2009　Toksvig et al.
9,715,720 B1　7/2017　Li et al.
　(Continued)

FOREIGN PATENT DOCUMENTS

CN　109697699 A　4/2019
CN　115330640 A　11/2022
　(Continued)

OTHER PUBLICATIONS

Dec. 17, 2025—(EP) Search Report—Application No. 23876384.1.
Dec. 5, 2023—(WO) Search Report—App PCT/CN2023/116123.
Nov. 23, 2022—(CN) Search Report—App 202211240562.4.

*Primary Examiner* — Duy M Dang
(74) *Attorney, Agent, or Firm* — Banner & Witcoff, Ltd.

(57) ABSTRACT

Provided is a noise reduction method of a lightmap, including: obtaining a lightmap (202); determining, by using each pixel in the lightmap as a target pixel, a noise reduction reference region corresponding to the target pixel in the lightmap, the noise reduction reference region including a reference pixel for noise reduction reference (204); determining a distance in three-dimensional space between the reference pixel and the target pixel (206); determining a light contribution parameter value of the reference pixel to the target pixel based on the distance (208); obtaining light data recorded for the reference pixel in the lightmap (210); and performing, based on the light contribution parameter value and the light data of the reference pixel, noise reduction on light data recorded for the target pixel in the lightmap, to obtain a noise-reduced lightmap (212).

20 Claims, 9 Drawing Sheets

(58) Field of Classification Search
　　CPC . G06F 3/041; G06F 2203/04103; G06T 5/70;
　　　　　　　　　　G06T 3/06; G06T 5/60; G06T
　　　　　　　2207/20084; G06T 15/04; G06T 15/506;
　　　　　　　　　　　　　　　　　　A63F 13/57
　　See application file for complete search history.

(56)　　　　　　　　　References Cited

U.S. PATENT DOCUMENTS

| | | |
|---|---|---|
| 2015/0262407 A1 | 9/2015 | Fursund et al. |
| 2017/0091917 A1 | 3/2017 | Bronstein et al. |
| 2018/0174352 A1 | 6/2018 | Kang |
| 2018/0338092 A1* | 11/2018 | Fan ........................... G06T 7/90 |

FOREIGN PATENT DOCUMENTS

| | | | |
|---|---|---|---|
| EP | 3217361 | A1 | 9/2017 |
| JP | 2016-201037 | A | 12/2016 |

* cited by examiner

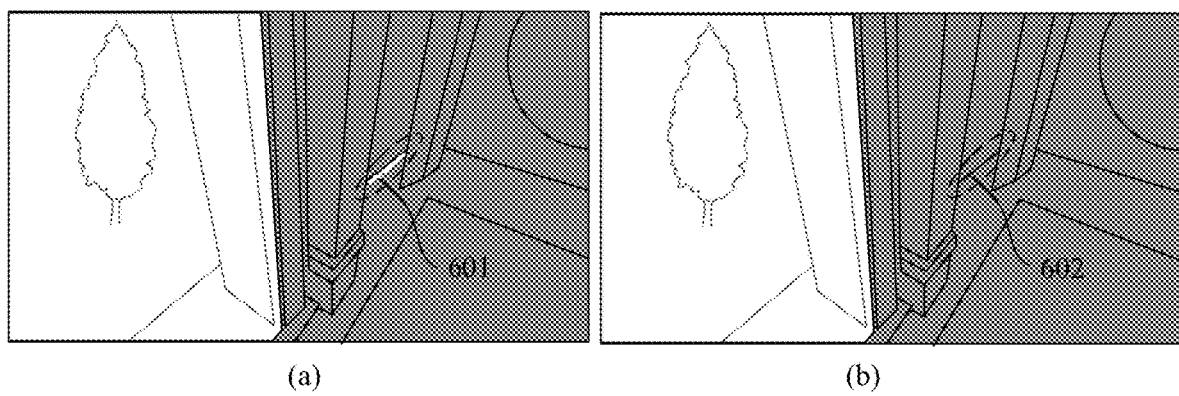
(a)                                        (b)
FIG. 6
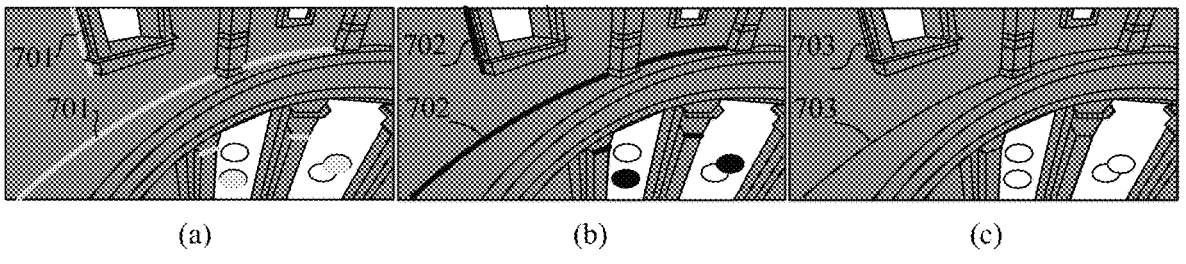
(a)                    (b)                    (c)
FIG. 7
| Parameter configuration interface | |
| --- | --- |
| XXXXXXXXXXX | ☑ |
| XXXXXXXXXXX | XXX ◥ |
| XXXXXXXXXXX | XXX ◥ |
| XXXXXXXXXXX | XXXXXXXXX ▼ |
| XXXXXXXXXXX | ☐ |
| XXXXXXXXXXX | ☑ |
| XXXXXXXXXXX | |
| XXXXXXXXXXX | ☑ |
| XXXXXXXXXXX | ☐ |
| Light leakage prevention | ☑ |
| Direct light smoothing parameter | 5 ◥ |
| Indirect light smoothing parameter | 5 ◥ |
FIG. 8

(a)

(b)

(a)

(b)

(a)

(b)

(c)

(a)          (b)          (c)

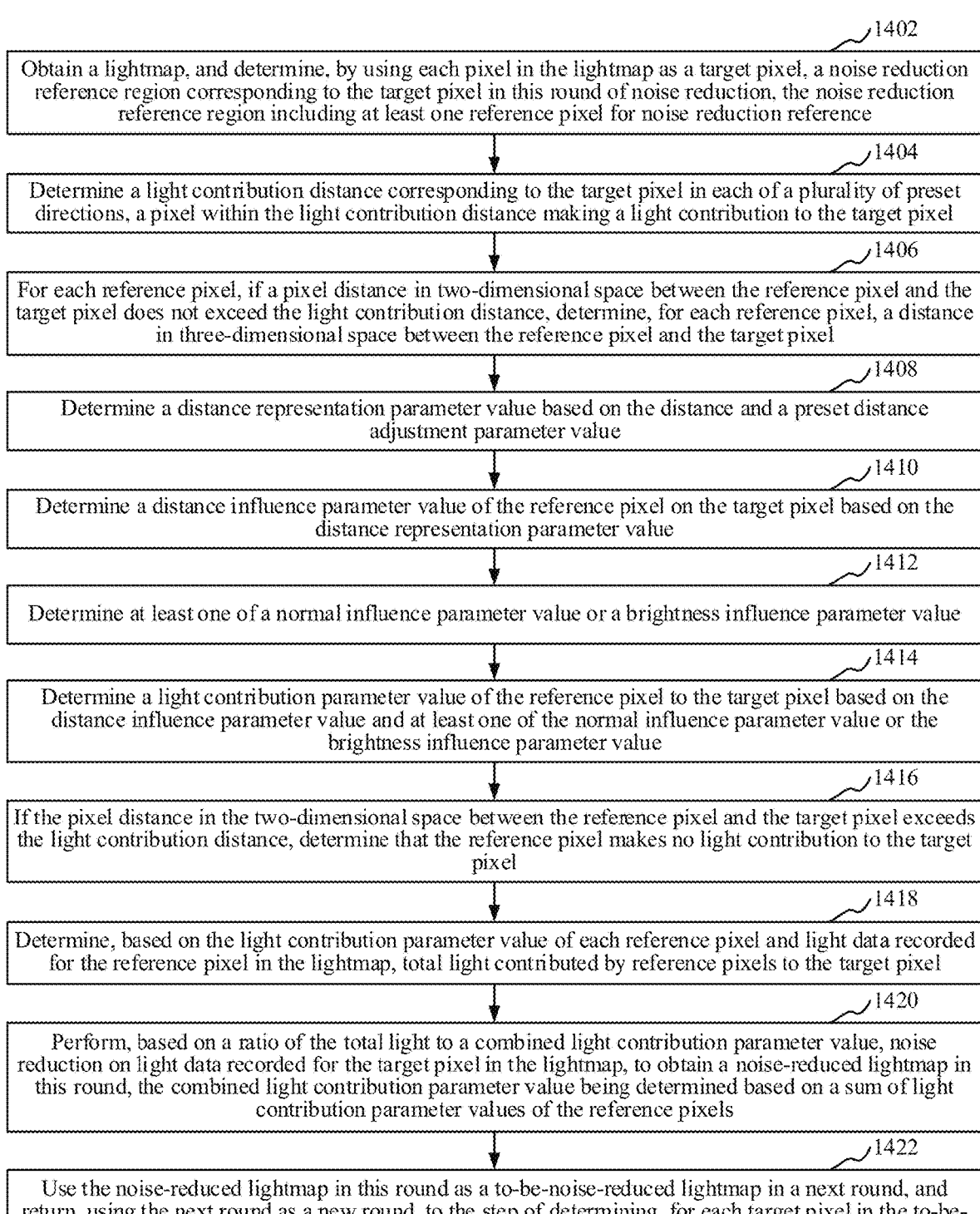

1402

Obtain a lightmap, and determine, by using each pixel in the lightmap as a target pixel, a noise reduction reference region corresponding to the target pixel in this round of noise reduction, the noise reduction reference region including at least one reference pixel for noise reduction reference

1404

Determine a light contribution distance corresponding to the target pixel in each of a plurality of preset directions, a pixel within the light contribution distance making a light contribution to the target pixel

1406

For each reference pixel, if a pixel distance in two-dimensional space between the reference pixel and the target pixel does not exceed the light contribution distance, determine, for each reference pixel, a distance in three-dimensional space between the reference pixel and the target pixel

1408

Determine a distance representation parameter value based on the distance and a preset distance adjustment parameter value

1410

Determine a distance influence parameter value of the reference pixel on the target pixel based on the distance representation parameter value

1412

Determine at least one of a normal influence parameter value or a brightness influence parameter value

1414

Determine a light contribution parameter value of the reference pixel to the target pixel based on the distance influence parameter value and at least one of the normal influence parameter value or the brightness influence parameter value

1416

If the pixel distance in the two-dimensional space between the reference pixel and the target pixel exceeds the light contribution distance, determine that the reference pixel makes no light contribution to the target pixel

1418

Determine, based on the light contribution parameter value of each reference pixel and light data recorded for the reference pixel in the lightmap, total light contributed by reference pixels to the target pixel

1420

Perform, based on a ratio of the total light to a combined light contribution parameter value, noise reduction on light data recorded for the target pixel in the lightmap, to obtain a noise-reduced lightmap in this round, the combined light contribution parameter value being determined based on a sum of light contribution parameter values of the reference pixels

1422

Use the noise-reduced lightmap in this round as a to-be-noise-reduced lightmap in a next round, and return, using the next round as a new round, to the step of determining, for each target pixel in the to-be-noise-reduced lightmap, the noise reduction reference region corresponding to the target pixel in this round of noise reduction for iterative noise reduction, until an iteration stopping condition is met, to obtain a noise-reduced lightmap for the to-be-noise-reduced lightmap

FIG. 14

NOISE REDUCTION FOR LIGHTMAP

RELATED APPLICATION

This application claims priority to PCT application PCT/CN2023/097301, filed Aug. 31, 2023, which claims priority to Chinese Patent Application No. 2022112405624, filed with the China National Intellectual Property Administration on Oct. 11, 2022, and entitled "NOISE REDUCTION METHOD AND APPARATUS OF LIGHTMAP, DEVICE, AND MEDIUM", each of which is incorporated herein by reference in its entirety.

FIELD OF THE TECHNOLOGY

This application relates to the field of image processing technologies, further, image noise reduction technologies, and in particular, to a noise reduction method and apparatus of a lightmap, a device, and a medium.

BACKGROUND OF THE DISCLOSURE

A baking system pre-calculates light and shadow of a static object under a stable light source. A result generated through the calculation is stored in a texture map, which may be referred to as a lightmap. In a scene with a fixed light source, a lightmap is used to replace real-time light calculation, which can reduce resource consumption, thereby increasing efficiency of running the scene. For example, in a game field, when a virtual scene is rendered, real-time light calculation may be replaced with a lightmap, which can increase efficiency of running the virtual scene. However, a finally generated lightmap has more noise due to various cases (for example, insufficient sampling of light sources) in the process of generating the lightmap. Consequently, an image obtained by subsequently performing light rendering using the lightmap is poor in quality. Therefore, it is usually necessary to perform noise reduction on the lightmap before performing light rendering using the lightmap.

In the conventional technology, noise reduction is usually performed on a lightmap by using a noise reduction method (for example, using a neural network noise reducer) for ordinary images. However, the noise reduction on the lightmap in the conventional technology leads to seam defects in a lightmap obtained through the noise reduction, which affects quality of an image finally obtained through rendering.

SUMMARY

According to various aspects provided in this application, a noise reduction method and apparatus of a lightmap, a device, and a medium are provided.

According to a first aspect, this application provides a noise reduction method of a lightmap, performed by a computer device, the method including: obtaining a lightmap; determining, by using each pixel in the lightmap as a target pixel, a noise reduction reference region corresponding to the target pixel in the lightmap, the noise reduction reference region including a reference pixel for noise reduction reference; determining a distance in three-dimensional space between the reference pixel and the target pixel; determining a light contribution parameter value of the reference pixel to the target pixel based on the distance; obtaining light data recorded for the reference pixel in the lightmap; and performing, based on the light contribution parameter value and the light data of the reference pixel, noise reduction on light data recorded for the target pixel in the lightmap, to obtain a noise-reduced lightmap.

According to a second aspect, this application provides a noise reduction apparatus of a lightmap, the apparatus including: a noise reduction reference region determining module, configured to obtain a lightmap; and determine, by using each pixel in the lightmap as a target pixel, a noise reduction reference region corresponding to the target pixel in the lightmap, the noise reduction reference region including a reference pixel for noise reduction reference; a light contribution parameter value determining module, configured to determine, for each reference pixel, a distance in three-dimensional space between the reference pixel and the target pixel; and determine a light contribution parameter value of the reference pixel to the target pixel based on the distance; and a noise reduction module, configured to obtain light data recorded for the reference pixel in the lightmap; and perform, based on the light contribution parameter value and the light data of the reference pixel, noise reduction on light data recorded for the target pixel in the lightmap, to obtain a noise-reduced lightmap.

According to a third aspect, this application provides a computer device, including a memory and a processor, the memory storing computer-readable instructions, and the processor executing the computer-readable instructions to perform the noise reduction method of a lightmap according to various aspects of this application.

According to a fourth aspect, this application provides a computer-readable storage medium, storing computer-readable instructions, the computer-readable instructions being executed by a processor to perform the noise reduction method of a lightmap according to various aspects of this application.

According to a fifth aspect, this application provides a computer program product, including computer-readable instructions, the computer-readable instructions being executed by a processor to perform the noise reduction method of a lightmap according to various aspects of this application.

Details of one or more aspects of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the aspects of this application or in the conventional technology more clearly, the following briefly describes the accompanying drawings required for describing the aspects or the conventional technology. Apparently, the accompanying drawings in the following descriptions show merely some aspects of this application, and a person of ordinary skill in the art may still derive other drawings from the disclosed accompanying drawings without creative efforts.

FIG. 6 is an example schematic diagram of an effect of light leakage prevention according to various aspects of the disclosure.

FIG. 7 is an example schematic diagram of an effect of light leakage prevention according to various aspects of the disclosure.

FIG. 8 is an example schematic diagram of a visualized parameter configuration interface according to various aspects of the disclosure.

FIG. 14 is an example schematic flowchart of a noise reduction method of a lightmap according to various aspects of the disclosure.

DETAILED DESCRIPTION

The technical solutions in the aspects of this application are clearly and completely described in the following with reference to the accompanying drawings in the aspects of this application. The described aspects are illustrative and should not be understood to limit the scope of this application. All other aspects obtained by a person of ordinary skill in the art based on aspects of this application without creative efforts shall fall within the protection scope of this application.

Figure 1:
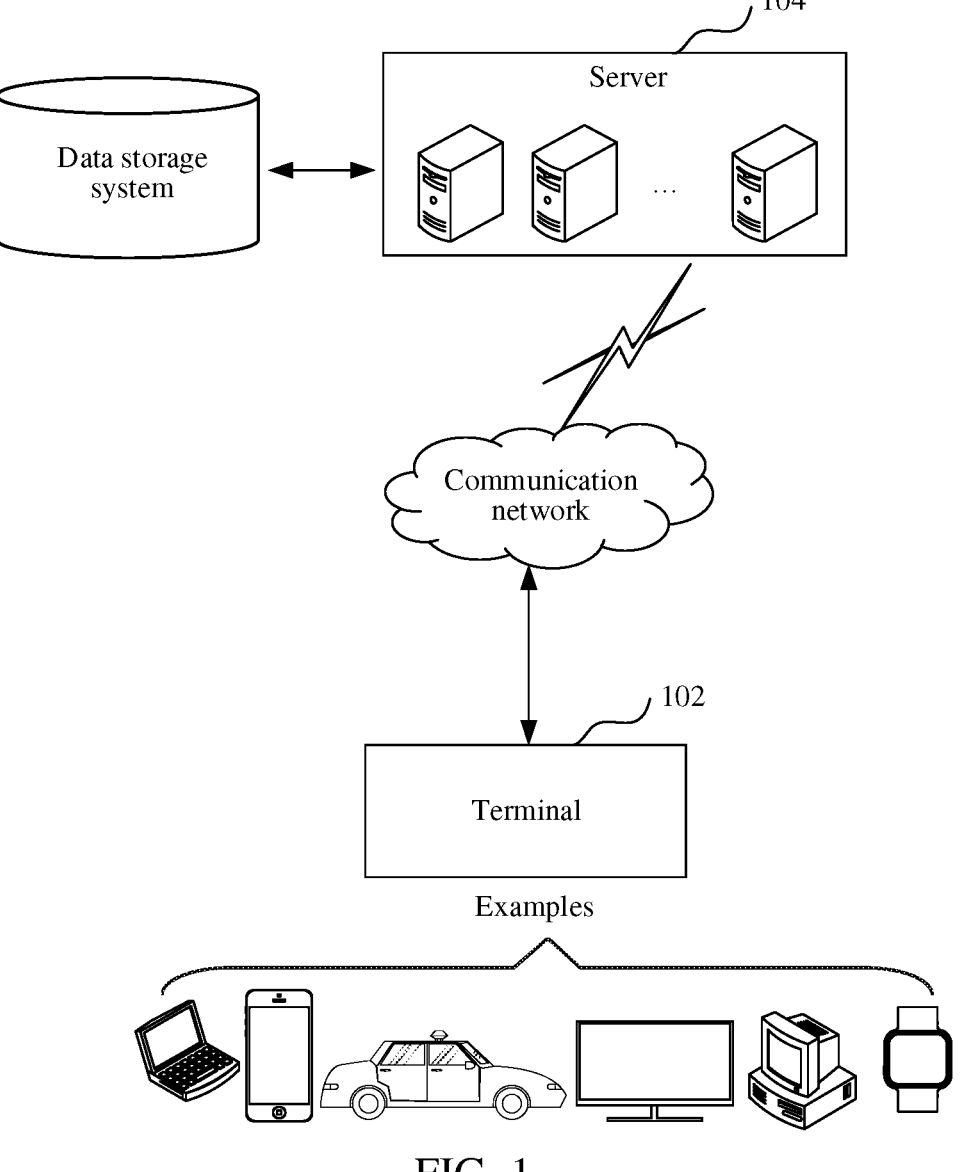
FIG. 1 is a diagram of an example application environment of a noise reduction method of a lightmap according various aspects of the disclosure.

A noise reduction method of a lightmap provided in this application may be applied to an application environment shown in FIG. 1. The application environment provides a computer system. The system includes a terminal 102 and a server 104. The terminal 102 communicates with the server 104 through a network. A data storage system may store data that the server 104 needs to process. The data storage system may be integrated into the server 104, or may be configured on cloud or another server. The terminal 102 may be, but is not limited to, any desktop computer, notebook computer, smartphone, tablet computer, internet of things device, or portable wearable device. The internet of things device may be a smart speaker, a smart TV, a smart air conditioner, a smart on-board device, or the like. The portable wearable device may be a smartwatch, a smart band, a headset device, or the like. The server 104 may be an independent physical server, or may be a server cluster or distributed system including a plurality of physical servers, or may be a cloud server providing basic cloud computing services such as cloud services, cloud databases, cloud computing, cloud functions, cloud storage, network services, cloud communication, middleware services, domain name services, security services, CDN, and big data and artificial intelligence platforms. The terminal 102 and the server 104 may be directly or indirectly connected through wired or wireless communication. This is not limited in this application.

Based on the foregoing computer system, the server 104 may obtain a lightmap; and determine, by using each pixel in the lightmap as a target pixel, a noise reduction reference region corresponding to the target pixel in the lightmap, the noise reduction reference region including a reference pixel for noise reduction reference. The server 104 may determine a distance in three-dimensional space between the reference pixel and the target pixel. The server 104 may determine a light contribution parameter value of the reference pixel to the target pixel based on the distance. The server 104 may obtain light data recorded for the reference pixel in the lightmap. The server 104 may perform, based on the light contribution parameter value and the light data of the reference pixel, noise reduction on light data recorded for the target pixel in the lightmap, to obtain a noise-reduced lightmap.

It may be understood that the server 104 may send the noise-reduced lightmap to the terminal 102. The terminal 102 may perform corresponding light rendering based on the received lightmap to obtain and display a rendered image. This is a non-limiting example and FIG. 1 should be understood as a helpful example and not limiting the various aspects of this disclosure. For example, the light rendering shown in FIG. 1 may be performed by an independent computer device or may be performed by a distributed system including a plurality of computer devices.

Figure 2:
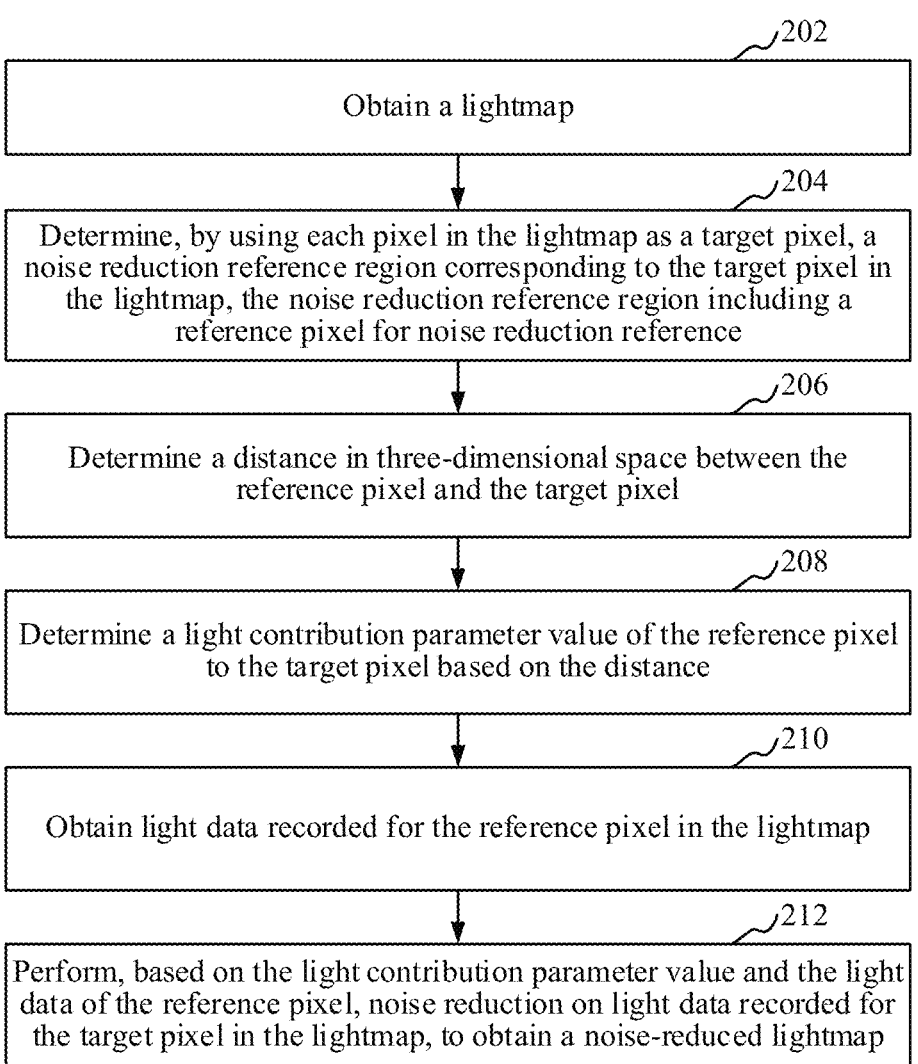
FIG. 2 is a schematic flowchart showing an example of a noise reduction method of a lightmap according to various aspects of the disclosure.

FIG. 2 shows an example of a noise reduction method of a lightmap is provided. The method may be applied to a computer device. The computer device may be a terminal or a server. The method may be implemented by the terminal or the server alone, or may be implemented through interaction between the terminal and the server. As one example, the method is applied to a computer device for description. The method includes the following actions:

The method obtains a lightmap.

As an example, the lightmap is a two-dimensional image that may be obtained by performing UV splitting (that is, two-dimensional splitting, where U and V respectively represent two dimensions in a two-dimensional coordinate system) on a three-dimensional virtual model in a virtual scene in three-dimensional space. In some cases, a lightmap has specific characteristics because the lightmap is a two-dimensional image obtained by performing UV splitting on a three-dimensional virtual model in a virtual scene in three-dimensional space. For example, two pixels that have a long pixel distance in the lightmap may be very close to each other in the three-dimensional space. In another example, the lightmap includes at least one UV island (that is, light data recording region) obtained through splitting. Each pixel in the UV island records light data. A filling region between UV islands is invalid, that is, a pixel in the filling region does not record light data.

In some examples, the light data may include at least one of color data, spherical harmonic coefficients, ambient light occlusion data, or sky light occlusion data. It may be understood that the color data, the spherical harmonic coefficients, the ambient light occlusion data, and the sky light occlusion data are different types of data in the lightmap, and may all be used to indicate light effects.

Figures 3, 4, 5:
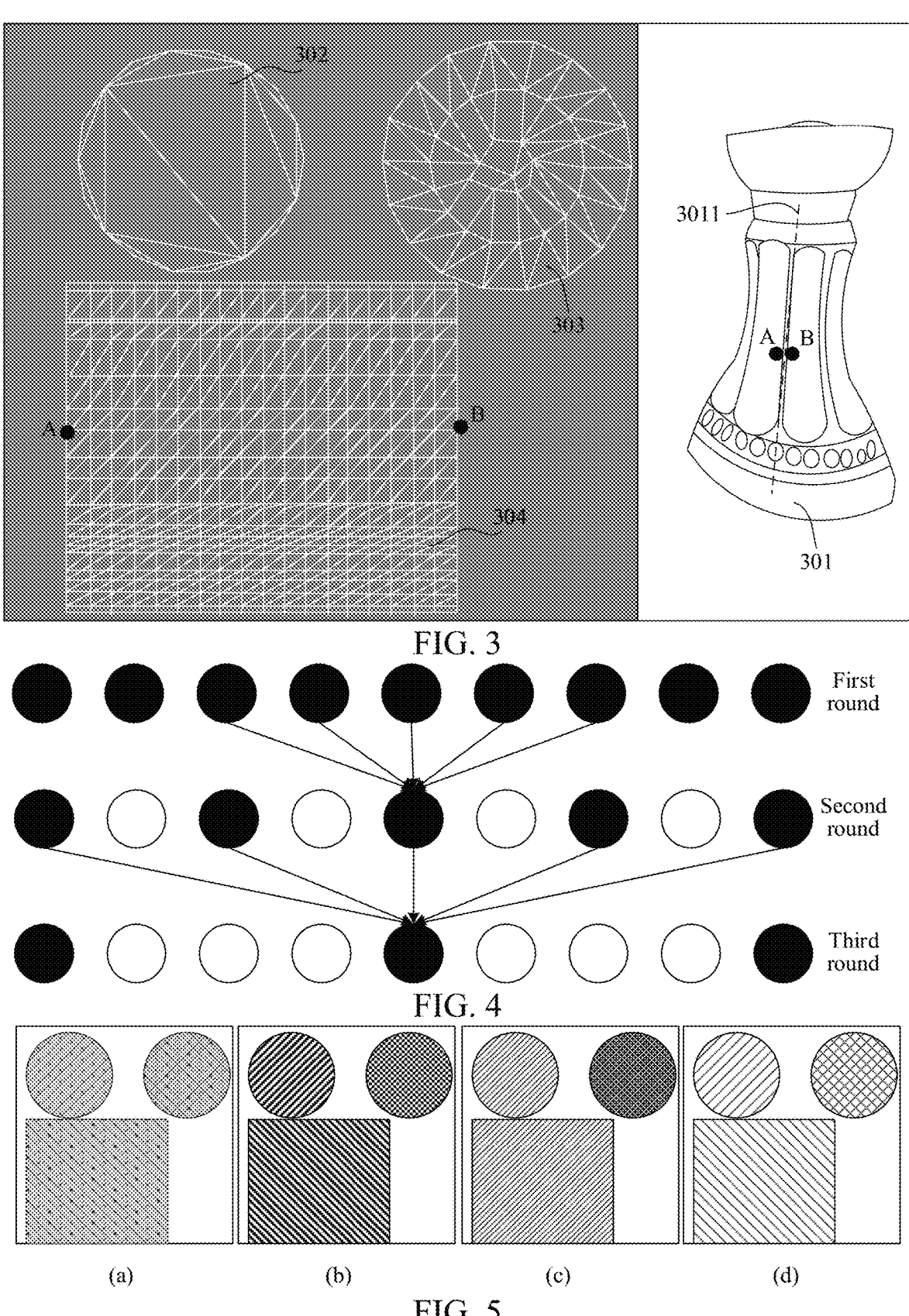
FIG. 3 is a schematic diagram of an example of a lightmap corresponding to a torch according to various aspects of the disclosure.
FIG. 4 is a schematic diagram of an example distribution of sampling points in a filter kernel according to various aspects of the disclosure.
FIG. 5 is a schematic diagram of an example comparison of effects of noise reduction on a lightmap of a torch according to various aspects of the disclosure.

As shown in FIG. 3, torch 301 (that is, a three-dimensional virtual model) in a virtual scene in three-dimensional space, and a gray region produces a lightmap obtained with UV splitting on the torch 301. The lightmap of the torch 301 includes three UV islands 302, 303, and 304. Each pixel in each UV island records light data for the torch 301. Compared with an ordinary image, the lightmap has specific characteristics. For example, in the three-dimensional space, a pixel A and a pixel B are close on the torch 301. After a handle portion of the torch is split along a split line 3011, the pixel A and the pixel B have a long pixel distance in the lightmap of the torch 301.

In some aspects of the disclosure, the computer device may obtain the lightmap locally or from another device through a network. The obtained lightmap is a lightmap that needs noise reduction, which may be an initial lightmap that has not been subjected to noise reduction or may be a lightmap that has been subjected to noise reduction at least once.

Step 204: Determine, by using each pixel in the lightmap as a target pixel, a noise reduction reference region corresponding to the target pixel in the lightmap, the noise reduction reference region including a reference pixel for noise reduction reference.

The target pixel is a particular pixel that needs noise reduction in the lightmap. Each pixel in the lightmap may be used as the target pixel, or each of some pixels in the lightmap may be used as the target pixel. Some pixels are, for example, pixels that record light data in the lightmap. The target pixel that does not record light data may be skipped from noise reduction. The pixel that does not record light data may be skipped from being used as a reference pixel.

The noise reduction reference region is a pixel region referenced in a process of noise reduction on the target pixel. The noise reduction reference region includes at least one reference pixel for noise reduction reference. The reference pixel is a pixel referenced in a process of noise reduction on the target pixel.

According to aspects of the disclosure, the computer device may obtain a to-be-noise-reduced lightmap, and may determine, by using each pixel in the lightmap as a target pixel, a noise reduction reference region corresponding to the target pixel in the lightmap for each pixel in the lightmap. The noise reduction reference region includes at least one reference pixel for noise reduction reference.

According to various aspects of the disclosure, for each target pixel, the computer device may determine a preset range region with the target pixel as a center, and use the preset range region as a noise reduction reference region corresponding to the target pixel in the lightmap. The preset range region may be rectangular or nearly circular. A size of the preset range region may be preset or may be determined based on a size of the lightmap. It may be understood that a pixel in the preset range region is a reference pixel.

In some aspects of the disclosure, the computer device may perform a plurality of rounds of noise reduction on the lightmap. It may be understood that a to-be-noise-reduced lightmap in each round is a noise-reduced lightmap in a previous round. If this round is the first round of noise reduction, a noise reduced lightmap in this round is a lightmap obtained by the computer device at the very beginning. The computer device may determine a noise reduction reference region corresponding to a target pixel in each round of noise reduction.

Step 206: Determine a distance in three-dimensional space between the reference pixel and the target pixel.

The computer device may determine, for each reference pixel in the noise reduction reference region, a distance in the three-dimensional space between each reference pixel and the target pixel.

The distance is a distance in the three-dimensional space between the reference pixel and the target pixel, which may be referred to as a world space distance. It may be understood that the distance in the three-dimensional space between the reference pixel and the target pixel may directly and accurately indicate relative locations of the reference pixel and the target pixel in the three-dimensional space.

Examples of the disclosure also include instances where the computer device may obtain world space coordinates corresponding to each pixel in the lightmap in the three-dimensional space, and the computer device may determine, for each reference pixel, a distance in the three-dimensional space between the reference pixel and the target pixel based on the world space coordinates of the reference pixel and the world space coordinates of the target pixel.

Step 208: Determine a light contribution parameter value of the reference pixel to the target pixel based on the distance.

The light contribution parameter value indicates a light contribution made by the reference pixel to the target pixel. It may be understood that a larger light contribution parameter value indicates a larger light contribution made by the reference pixel to the target pixel, and a smaller light contribution parameter value indicates a smaller light contribution made by the reference pixel to the target pixel. The light contribution indicates an influence on a light effect. No light contribution indicates no influence on a light effect.

Additionally, in some cases, the computer device may determine the light contribution parameter value of the reference pixel to the target pixel based on the distance in the three-dimensional space between the reference pixel and the target pixel. It may be understood that a shorter distance in the three-dimensional space between the reference pixel and the target pixel indicates a larger light contribution parameter value of the reference pixel to the target pixel, and a longer distance in the three-dimensional space between the reference pixel and the target pixel indicates a smaller light contribution parameter value of the reference pixel to the target pixel.

It's also possible in various aspects of the disclosure for each target pixel in the lightmap corresponds to a preset light contribution distance. A reference pixel within the light contribution distance makes a light contribution to the target pixel, and a reference pixel out of the light contribution distance makes no light contribution to the target pixel. It may be understood that the computer device may determine, for each reference pixel within the light contribution distance, the distance in the three-dimensional space between the reference pixel and the target pixel, and determine the light contribution parameter value of the reference pixel to the target pixel based on the distance. For each reference pixel out of the light contribution distance, the computer device may determine that the reference pixel makes no light contribution to the target pixel.

Step 210: Obtain light data recorded for the reference pixel in the lightmap.

The lightmap includes at least one UV island (that is, light data recording region) obtained through splitting. Each pixel in the UV island records light data. The computer device May obtain the light data recorded for the reference pixel in the light data recording region. A filling region between UV islands is invalid, that is, a pixel in the filling region does not record light data. In some cases, the light data may include at least one of color data, spherical harmonic coefficients, ambient light occlusion data, or sky light occlusion data. The reference pixel that does not record light data may be skipped from noise reduction.

Step 212: Perform, based on the light contribution parameter value and the light data of the reference pixel, noise reduction on light data recorded for the target pixel in the lightmap, to obtain a noise-reduced lightmap.

The computer device may obtain the light data recorded for the target pixel and the light data recorded for the reference pixel in the lightmap. For each target pixel in the lightmap, the computer device may perform, based on the light contribution parameter value of each reference pixel corresponding to the target pixel and the light data recorded for each reference pixel in the lightmap, noise reduction on the light data recorded for the target pixel in the lightmap. Noise reduction on each target pixel in the lightmap is completed to obtain the noise-reduced lightmap.

Additionally, in some aspects of the disclosure, for each target pixel in the lightmap, the computer device may use the light contribution parameter value of each reference pixel corresponding to the target pixel as a light contribution weight of each reference pixel. Weighted average processing is performed on light data recorded for all reference pixels based on the light contribution weight corresponding to each reference pixel, and the light data recorded for the target pixel in the lightmap is replaced with light data obtained through the weighted average processing, to implement noise reduction on the light data recorded for the target pixel in the lightmap. Noise reduction on each target pixel in the lightmap is completed to obtain the noise-reduced lightmap. A larger light contribution weight indicates a larger light contribution made by the reference pixel to the target pixel, and a smaller light contribution weight indicates a smaller light contribution made by the reference pixel to the target pixel.

In the noise reduction method of a lightmap, for each target pixel in a to-be-noise-reduced lightmap, a noise reduction reference region corresponding to the target pixel in the lightmap is determined. The noise reduction reference region includes at least one reference pixel for noise reduction reference. For each reference pixel, a distance in three-dimensional space between the reference pixel and the target pixel is determined. The distance in the three-dimensional space between the reference pixel and the target pixel may directly and accurately indicate relative locations of the reference pixel and the target pixel in the three-dimensional space. Therefore, a light contribution parameter value of the reference pixel to the target pixel is determined based on the distance, which can increase the accuracy of the light contribution parameter value. Further, noise reduction is performed on light data recorded for the target pixel in the lightmap based on the accurate light contribution parameter value of each reference pixel and light data recorded for the reference pixel in the lightmap, which can improve a noise reduction effect for the lightmap to obtain a lightmap that can avoid seam defects, thereby improving the quality of an image obtained by performing light rendering based on the lightmap.

A neural network noise reducer sampled in a conventional noise reduction method is a noise reducer obtained through training for ordinary images, and each pixel in the ordinary images records only color data. In this case, noise reduction can be performed by using the neural network noise reducer only on color data in a lightmap, but not on light data other than the color data. According to the noise reduction method of a lightmap in this application, a light contribution parameter value of a reference pixel to a target pixel based on a distance that can directly and accurately indicate relative locations of the reference pixel and the target pixel in three-dimensional space, and then noise reduction is directly performed, based on the light contribution parameter value of each reference pixel and light data recorded for the reference pixel in the lightmap, on light data recorded for the target pixel in the lightmap. In this case, noise reduction can be performed on all types of light data recorded for pixels, instead of being limited to noise reduction on only light data of the color data type, thereby improving a noise reduction effect for the lightmap.

In some instances, the noise reduction method of a lightmap is performed iteratively, and a light image obtained in each round of iteration is a lightmap noise-reduced in a previous round of iteration. Each round of iteration is each round of noise reduction. The iteration ends when an iteration stopping condition is met. The iteration stopping condition may be that the iteration reaches a preset quantity of times or that a lightmap obtained through iterative noise reduction meets a preset quality determination condition. The preset quantity of times is, for example, a few times, tens of times, hundreds of times, or thousands of times. The quality determination condition may be determined based on a quantity of noise and a color jump case.

In the example shown, step 202 includes: obtaining a light image noise-reduced in a previous round of iteration.

In some examples, the determining, by using each pixel in the lightmap as a target pixel, a noise reduction reference region corresponding to the target pixel in the lightmap includes: determining, by using the pixel in the lightmap as the target pixel, the noise reduction reference region corresponding to the target pixel in the lightmap in this round of noise reduction.

It is also possible that the noise reduction method of a lightmap further includes: using the noise-reduced lightmap in this round as a to-be-noise-reduced lightmap in a next round, and returning, using the next round as a new round, to the step of determining, by using the pixel in the lightmap as the target pixel, the noise reduction reference region corresponding to the target pixel in the lightmap in this round of noise reduction for iterative noise reduction, until the iteration stopping condition is met.

Aspects of the disclosure also include situations where the computer device may determine, for each target pixel in the to-be-noise-reduced lightmap, the noise reduction reference region corresponding to the target pixel in this round of noise reduction. The computer device may determine, for each reference pixel in the noise reduction reference region, the distance in the three-dimensional space between the reference pixel and the target pixel, and determine the light contribution parameter value of the reference pixel to the target pixel based on the distance. Further, the computer device may perform, based on the light contribution parameter value of each reference pixel corresponding to the target pixel and the light data recorded for the reference pixel in the lightmap, noise reduction on the light data recorded for the target pixel in the lightmap. Noise reduction on each target pixel in the lightmap is completed to obtain the noise-reduced lightmap in this round. The computer device may use the noise-reduced lightmap in this round as the to-be-noise-reduced lightmap in the next round, and return, using the next round as a new round, to the step of determining, for each target pixel in the to-be-noise-reduced lightmap, the noise reduction reference region corresponding to the target pixel in this round of noise reduction for iterative noise reduction, until the iteration stopping condition is met, to obtain the noise-reduced lightmap for the to-be-noise-reduced lightmap.

In the foregoing aspects, the noise-reduced lightmap in the previous round is used as the to-be-noise-reduced lightmap in the next round to perform a plurality of rounds of noise reduction on the lightmap, which can further improve a noise reduction effect for the lightmap.

According to aspects of the disclosure, the noise reduction reference region is determined based on a sampling range of a first filter kernel in each of preset rounds of iteration starting from the first round, the noise reduction reference region is determined based on a sampling range of a second filter kernel in each round of iteration after the preset rounds of iteration starting from the first round, and the sampling range of the first filter kernel is smaller than the sampling range of the second filter kernel.

Moreover, in some cases, the noise reduction reference region corresponding to the target pixel may be determined based on a sampling range of a first filter kernel in each of previous preset rounds of noise reduction; the noise reduction reference region corresponding to the target pixel is determined based on a sampling range of a second filter kernel in each round of noise reduction after the previous preset rounds; and the sampling range of the first filter kernel is smaller than the sampling range of the second filter kernel.

The first filter kernel is a filter kernel used in each of the previous preset rounds of noise reduction. The second filter kernel is a filter kernel used in each round of noise reduction after the previous preset rounds. The sampling range of the first filter kernel is smaller than the sampling range of the second filter kernel. The sampling range of the first filter kernel is a range covered by sampling points in the first filter kernel. The sampling range of the second filter kernel is a range covered by sampling points in the second filter kernel. It may be understood that a quantity of the sampling points in the first filter kernel is less than a quantity of the sampling points in the second filter kernel. For example, the sampling range of the first filter kernel may be 5*5, including 25 sampling points. The sampling range of the second filter kernel is 64*64, including 4096 sampling points. It may be understood that the filter kernel is essentially a filter matrix for filtering, and one element in the filter matrix corresponds to one sampling point. For example, a filter kernel with a sampling range of 5*5 is essentially a 5*5 filter matrix.

FIG. 4 shows an example of various aspects of the disclosure. As shown in the example of FIG. 4, in each of previous preset rounds of noise reduction, spacing between any two neighboring sampling points (that is, black points in FIG. 4) in the first filter kernel used in this round is greater than spacing between any two neighboring sampling points in a previous round. Similarly, referring to FIG. 4, in each round of noise reduction after the previous preset rounds, spacing between any two neighboring sampling points in the second filter kernel used in this round is greater than spacing between any two neighboring sampling points in a previous round. In this case, the sampling range of the filter kernel can gradually cover the whole lightmap through a plurality of rounds of iterative noise reduction, which can better utilize the distance between each reference pixel and the target pixel, and can further avoid seam defects, thereby improving a noise reduction effect for the lightmap. It may be understood that the previous preset rounds are preset iteration rounds that are previous in the iterative noise reduction. For example, if the iterative noise reduction includes a total of 10 rounds, and the previous preset rounds are previous six rounds, four rounds of the iterative noise reduction are included after the previous preset rounds.

In the foregoing aspects, in each of the previous preset rounds of noise reduction, the noise reduction reference region corresponding to the target pixel is determined by using the first filter kernel with a small sampling range, so that high frequency of the lightmap can be gradually reduced. In this case, a noise reduction effect for the lightmap can be further improved. It may be understood that higher frequency indicates a higher level of noise in the lightmap. Further, in each round of noise reduction after the previous preset rounds, the noise reduction reference region corresponding to the target pixel is determined by using the second filter kernel with a large sampling range, which can better utilize the distance between each reference pixel and the target pixel, and can further avoid seam defects, thereby improving a noise reduction effect for the lightmap.

In some instances, the determining a light contribution parameter value of the reference pixel to the target pixel based on the distance includes: determining a distance influence parameter value of the reference pixel on the target pixel based on the distance. The distance influence parameter value indicates an influence of the distance on a light contribution.

Aspects of the disclosure also include situations where the computer device may determine the distance influence parameter value of the reference pixel on the target pixel based on the distance, and determine the light contribution parameter value based on the distance influence parameter value. The distance influence parameter value indicates an influence of the distance on a light contribution. It may be understood that a shorter distance between the target pixel and the reference pixel indicates a larger distance influence parameter value of the reference pixel on the target pixel, and a longer distance between the target pixel and the reference pixel indicates a smaller distance influence parameter value of the reference pixel on the target pixel.

The computer device may perform normalization on the distance, and determine the distance influence parameter value of the reference pixel on the target pixel based on a result of the normalization.

In some instances, the computer device may directly use the distance influence parameter value as the light contribution parameter value.

In the foregoing aspects, the distance influence parameter value of the reference pixel on the target pixel is determined based on the distance, and the light contribution parameter value is determined based on the distance influence parameter value, which can increase the calculation accuracy of the light contribution parameter value.

This disclosure also embraces instances where the determining a distance influence parameter value of the reference pixel on the target pixel based on the distance includes: obtaining a preset distance adjustment parameter value; determining a distance representation parameter value based on the distance and the distance adjustment parameter value, the distance representation parameter value indicating a distance in the three-dimensional space between the reference pixel and the target pixel; and determining the distance influence parameter value of the reference pixel on the target pixel based on the distance representation parameter value.

The computer device may determine the distance representation parameter value based on the distance and the preset distance adjustment parameter value, and determine the distance influence parameter value of the reference pixel on the target pixel based on the distance representation parameter value. The distance representation parameter value indicates a distance in the three-dimensional space between the reference pixel and the target pixel. It may be understood that a shorter distance in the three-dimensional space between the reference pixel and the target pixel indicates a larger distance representation parameter value, and a longer distance in the three-dimensional space between the reference pixel and the target pixel indicates a smaller distance representation parameter value.

The computer device may determine the distance representation parameter value based on a ratio of the distance to the preset distance adjustment parameter value. The computer device may determine the ratio of the distance to the preset distance adjustment parameter value as the distance representation parameter value, or may slightly adjust the ratio of the distance to the preset distance adjustment parameter value to obtain the distance representation parameter value.

In the foregoing aspects, the distance representation parameter value is determined based on the distance and the preset distance adjustment parameter value, and the distance influence parameter value of the reference pixel on the target pixel is determined based on the distance representation parameter value, which can increase the calculation accuracy of the distance influence parameter value, thereby providing more accurate noise reduction and better image quality performance.

The light contribution parameter value may, in various instances, be determined based on the distance influence parameter value includes: obtaining at least one of a normal influence parameter value or a brightness influence parameter value, the normal influence parameter value indicating influences of a normal of the target pixel and a normal of the reference pixel on a light contribution, the brightness influence parameter value indicating influences of brightness of the target pixel and brightness of the reference pixel on a light contribution, the normal influence parameter value being determined based on the normal of the target pixel and the normal of the reference pixel, and the brightness influence parameter value being determined based on the brightness of the target pixel and the brightness of the reference pixel; and determining the light contribution parameter value of the reference pixel to the target pixel based on the distance influence parameter value and at least one of the normal influence parameter value or the brightness influence parameter value.

It's also possible that the light contribution parameter value is determined based on the distance influence parameter value includes: determining at least one of a normal influence parameter value and a brightness influence parameter value, the normal influence parameter value indicating influences of a normal of the target pixel and a normal of the reference pixel on a light contribution, the brightness influence parameter value indicating influences of brightness of the target pixel and brightness of the reference pixel on a light contribution, the normal influence parameter value being determined based on the normal of the target pixel and the normal of the reference pixel, and the brightness influence parameter value being determined based on the brightness of the target pixel and the brightness of the reference pixel; and determining the light contribution parameter value of the reference pixel to the target pixel based on the distance influence parameter value and at least one of the normal influence parameter value and the brightness influence parameter value.

The normal influence parameter value may, in various aspects of the disclosure, be determined based on a product of a normal vector of the target pixel and a normal vector of the reference pixel. The normal influence parameter value may be the product of the normal vector of the target pixel and the normal vector of the reference pixel, or may be obtained by slightly adjusting the product of the normal vector of the target pixel and the normal vector of the reference pixel. It may be understood that the product of the normal vector of the target pixel and the normal vector of the reference pixel may indicate a similarity between the normal of the target pixel and the normal of the reference pixel. A larger similarity between the normal of the target pixel and the normal of the reference pixel indicates a larger light contribution of the reference pixel to the target pixel and a larger normal influence parameter value. A smaller similarity between the normal of the target pixel and the normal of the reference pixel indicates a smaller light contribution of the reference pixel to the target pixel and a smaller normal influence parameter value.

The brightness influence parameter value may be determined based on a difference between a brightness value of the target pixel and a brightness value of the reference pixel. The brightness influence parameter value may be the difference between the brightness value of the target pixel and the brightness value of the reference pixel, or may be obtained by slightly adjusting the difference between the brightness value of the target pixel and the brightness value of the reference pixel. The difference may be obtained through direct subtraction, or by taking an absolute value after subtraction, or through squaring after subtraction. A smaller difference between the brightness of the target pixel and the brightness of the reference pixel indicates a larger light contribution of the reference pixel to the target pixel and a larger brightness influence parameter value. A larger difference between the brightness of the target pixel and the brightness of the reference pixel indicates a smaller light contribution of the reference pixel to the target pixel and a smaller brightness influence parameter value.

Also, the computer device may determine the light contribution parameter value of the reference pixel to the target pixel based on the distance influence parameter value, the normal influence parameter value, and the brightness influence parameter value, and perform noise reduction on the lightmap based on the light contribution parameter value. It may be understood that a boundary of a geometric object can be better recognized during noise reduction based on the normal influence parameter value to avoid blurring between different geometric objects. Noise reduction can be performed adaptively according to a noise degree based on the brightness influence parameter value, so that an image obtained through rendering based on the noise-reduced lightmap has a smooth light effect.

As shown in FIG. 5, (a) shows a lightmap before noise reduction, which includes more noise; (b) shows a lightmap obtained by determining a light contribution parameter value only based on a normal influence parameter value and performing noise reduction on a lightmap based on the light contribution parameter value, which still has more noise, but reduced compared with (a); (c) shows a lightmap obtained by determining a light contribution parameter value only based on a brightness influence parameter value and performing noise reduction on a lightmap based on the light contribution parameter value, which still has more noise, but reduced compared with (a); and (d) shows a lightmap obtained by determining a light contribution parameter value based on a distance influence parameter value, a normal influence parameter value, and a brightness influence parameter value, and performing noise reduction on a lightmap based on the light contribution parameter value, which substantially has noise in the lightmap effectively removed compared with (a). It can be learned by comparing (a), (b), (c), and (d) in FIG. 5 that determining the light contribution parameter value based on the distance influence parameter value, the normal influence parameter value, and the brightness influence parameter value, and performing noise reduction on the lightmap based on the light contribution parameter value can improve a noise reduction effect for the lightmap.

In the foregoing aspects, the light contribution parameter value of the reference pixel to the target pixel is determined based on at least one of the distance influence parameter value, the normal influence parameter value, or the brightness influence parameter value, which can further increase the accuracy of the light contribution parameter value, thereby further improving a noise reduction effect for the lightmap.

Aspects of the disclosure include situations where the noise reduction method of a lightmap further includes: determining a light contribution distance corresponding to the target pixel in each of a plurality of preset directions, a pixel within the light contribution distance making a light contribution to the target pixel; and performing, for each reference pixel, in a case that a pixel distance in two-dimensional space between the reference pixel and the target pixel does not exceed the light contribution distance, the operations of determining a distance in three-dimensional space between the reference pixel and the target pixel and determining a light contribution parameter value of the reference pixel to the target pixel based on the distance.

The light contribution distance indicates an effective distance that makes a light contribution to the target pixel. A pixel within the light contribution distance makes a light contribution to the target pixel. A pixel distance between two pixels is a distance in two-dimensional space between the two pixels in the lightmap.

The computer device may determine the light contribution distance corresponding to the target pixel in each of the plurality of preset directions. For each reference pixel, the computer device may compare the pixel distance in the two-dimensional space between the reference pixel and the target pixel with the light contribution distance. If the pixel distance in the two-dimensional space between the reference pixel and the target pixel does not exceed the light contribution distance, the computer device may perform the operations of determining a distance in three-dimensional space between the reference pixel and the target pixel and determining a light contribution parameter value of the reference pixel to the target pixel based on the distance.

In some cases, the preset direction may specifically include at least one of up, down, left, right, upper left, lower left, upper right, and lower right of the target pixel.

The computer device may set a preset distance for each of the plurality of preset directions, and use the preset distance corresponding to each of the plurality of preset directions as the light contribution distance corresponding to the target pixel in each of the plurality of preset directions.

In the foregoing aspects, there is no occlusion between the pixel within the light contribution distance and the target pixel, and there may be occlusion between the pixel out of the light contribution distance and the target pixel. Therefore, if the pixel distance in the two-dimensional space between the reference pixel and the target pixel does not exceed the light contribution distance, the light contribution parameter value of the reference pixel to the target pixel is determined. If the pixel distance in the two-dimensional space between the reference pixel and the target pixel exceeds the light contribution distance, it is determined that the reference pixel makes no light contribution to the target pixel. This can avoid a light leak in a scene in an image obtained through rendering based on the lightmap, thereby further improving the quality of the image obtained through rendering based on the lightmap.

Aspects of the disclosure further include instances where the noise reduction method of a lightmap further includes: determining, in a case that the pixel distance in the two-dimensional space between the reference pixel and the target pixel exceeds the light contribution distance, that the reference pixel makes no light contribution to the target pixel.

In various aspects of the disclosure, if the pixel distance in the two-dimensional space between the reference pixel and the target pixel does not exceed the light contribution distance, the light contribution parameter value of the reference pixel to the target pixel is determined. If the pixel distance in the two-dimensional space between the reference pixel and the target pixel exceeds the light contribution distance, it is determined that the reference pixel makes no light contribution to the target pixel. This can avoid a light leak in a scene in an image obtained through rendering based on the lightmap, thereby further improving the quality of the image obtained through rendering based on the lightmap. In addition, directly determining no light contribution can reduce useless calculation and further reduce the waste of resources.

As shown in FIG. 6, noise reduction on a lightmap by using a conventional noise reduction method of a lightmap results in a light leak. For example, a bright part shown by 601 in (a) is an effect of a light leak from the outdoors into the indoors through the wall. According to the noise reduction method of a lightmap in this application, when the light contribution parameter value of the reference pixel to the target pixel is determined, whether there is occlusion between the reference pixel and the target pixel is considered. This can avoid a light leak in a scene in an image obtained through rendering based on the lightmap, thereby further improving the quality of the image obtained through rendering based on the lightmap. For example, there is no light leak at a lower part 602 of the indoor wall in (b), so that a rendered scene of an image in (b) is more realistic.

Additionally, the determining a light contribution distance corresponding to the target pixel in each of a plurality of preset directions may include: performing occlusion pixel detection in each of the plurality of preset directions of the target pixel using the target pixel as a start point; and determining, for each preset direction, in a case that an occluded pixel is detected in the preset direction, the light contribution distance corresponding to the target pixel in the preset direction based on a pixel distance between the target pixel and the detected occluded pixel.

The occluded pixel is a pixel occluded by a geometric object in a virtual scene in three-dimensional space.

The computer device may perform occlusion pixel detection in each of the plurality of preset directions of the target pixel using the target pixel as the start point. For each preset direction, in a case that the occluded pixel is first detected in the preset direction, the computer device may determine the light contribution distance corresponding to the target pixel in the preset direction based on the pixel distance between the target pixel and the first detected occluded pixel.

The computer device may directly use the pixel distance between the target pixel and the first detected occluded pixel as the light contribution distance corresponding to the target pixel in the preset direction.

In the foregoing aspects, once the occluded pixel is detected in the preset direction, the light contribution distance corresponding to the target pixel in the preset direction is determined based on the pixel distance between the target pixel and the first detected occluded pixel, which can increase the accuracy of the light contribution distance in the preset direction, and can further avoid a light leak in a scene in an image obtained through rendering based on the lightmap.

The method may further include: determining a pixel in an occluded state in the lightmap, and adding an occlusion marker to the pixel in the occluded state in the lightmap.

When there is an occluded pixel it is possible for it to be detected in any preset direction, a pixel distance between the target pixel and the occluded pixel detected in the direction, and determining a light contribution distance corresponding to the target pixel in the preset direction based on the obtained pixel distance includes: obtaining, in a case that the pixel with the occlusion marker is detected in the lightmap in any preset direction, a pixel distance between the target pixel and the detected pixel with the occlusion marker, and determining the light contribution distance corresponding to the target pixel in the preset direction based on the obtained pixel distance.

For each preset direction, in a case that the pixel with the occlusion marker is detected in the lightmap in the preset direction, the computer device determines the light contribution distance corresponding to the target pixel in the direction based on the pixel distance between the target pixel and the detected pixel with the occlusion marker.

In the process of generating the lightmap through light calculation, the computer device may determine the pixel in the occluded state in the lightmap, and add the occlusion marker to the pixel in the occluded state in the lightmap. In the process of performing noise reduction on the lightmap, the computer device may perform occlusion pixel detection in each of the plurality of preset directions of the target pixel using the target pixel as the start point. For each preset direction, in a case that the pixel with the occlusion marker is first detected in the lightmap in the preset direction, the computer device may determine the light contribution distance corresponding to the target pixel in the direction based on the pixel distance between the target pixel and the first detected pixel with the occlusion marker.

Sometimes, for each pixel in the lightmap, if there is a geometric object in a preset neighborhood range of the pixel in three-dimensional space, and a normal of the geometric object is in an opposite direction to a normal of the pixel, the computer device may determine the pixel as a pixel in an occluded state in the lightmap.

As shown in FIG. 7, (a) shows a scene image obtained by performing noise reduction on a lightmap by using a conventional noise reduction method and then performing light rendering based on a noise-reduced lightmap, and apparently, there is a light leak in a lower region of the indoor wall in (a) (for example, a region 701 in (a)); (b) shows that an occlusion marker is added to a pixel in an occluded state in a lightmap (for example, a region 702 in (b)); and (c) shows a scene image obtained by performing noise reduction on a lightmap by using the noise reduction method of a lightmap in this application and then performing light rendering based on a noise-reduced lightmap, and apparently, a light leak is avoided in a lower region of the indoor wall in (c) (for example, a region 703 in (c)), so that the scene image obtained through rendering is more realistic.

In the foregoing aspects, the occlusion marker is added to the pixel in the occluded state in the lightmap, which can facilitate subsequent calculation of the light contribution distance. In a case that the pixel with the occlusion marker is first detected in the lightmap in the preset direction, the light contribution distance corresponding to the target pixel in the direction is determined based on the pixel distance between the target pixel and the detected pixel with the occlusion marker, which can further increase the accuracy of the light contribution distance in the preset direction.

Lightmaps can be obtained by performing two-dimensional splitting on a three-dimensional virtual model in a virtual scene in three-dimensional space, and the determining a pixel in an occluded state in the lightmap includes: correspondingly determining, for each pixel in the lightmap, from the virtual scene in the three-dimensional space, a geometric surface that intersects a plurality of rays starting from the pixel at the shortest distance; and determining the pixel in the occluded state from pixels in the lightmap based on a relationship between a direction of a normal of the pixel and a direction of a normal of the correspondingly determined geometric surface.

For each pixel in the lightmap, the computer device may use the geometric surface that intersects the plurality of rays starting from the pixel at the shortest distance in the virtual scene in the three-dimensional space as a target geometric surface corresponding to the pixel. The computer device may determine the pixel in the occluded state from the pixels in the lightmap based on a relationship between a direction of a normal of each pixel and a direction of a normal of the target geometric surface.

For each pixel in the lightmap, it is frequently desirable, if the direction of the normal of the pixel and the normal of the corresponding target geometric surface meet an almost opposite direction condition, for the computer device to determine the pixel as the pixel in the occluded state. The almost opposite direction condition means that an included angle between a normal vector of the pixel and a normal vector of the corresponding target geometric surface is within a preset angle range.

Also, for each pixel in the lightmap, if the direction of the normal of the pixel is opposite to the direction of the normal of the corresponding target geometric surface, the computer device may determine the pixel as the pixel in the occluded state.

In the foregoing aspects, the relationship between the direction of the normal of the pixel and the direction of the normal of the corresponding target geometric surface can indicate orientations of the pixel and the target geometric surface. Therefore, the pixel in the occluded state is determined from the pixels of the lightmap based on the relationship between the direction of the normal of the pixel and the direction of the normal of the corresponding target geometric surface, which can increase the detection accuracy of the pixel in the occluded state.

Moreover, in various aspects of the disclosure, the performing, based on the light contribution parameter value and the light data of the reference pixel, noise reduction on light data recorded for the target pixel in the lightmap, to obtain a noise-reduced lightmap includes: determining, based on the light contribution parameter value of each reference pixel and the light data recorded for each reference pixel, total light contributed by reference pixels to the target pixel; obtaining a combined light contribution parameter value, the combined light contribution parameter value being determined based on a sum of light contribution parameter values of the reference pixels; and performing, based on a ratio of the total light to the combined light contribution parameter value, noise reduction on the light data recorded for the target pixel in the lightmap, to obtain the noise-reduced lightmap.

The computer device may determine, based on the light contribution parameter value of each reference pixel and the light data recorded for the reference pixel in the lightmap, the total light contributed by the reference pixels to the target pixel; and perform, based on the ratio of the total light to the combined light contribution parameter value, noise reduction on the light data recorded for the target pixel in the lightmap, to obtain the noise-reduced lightmap. The combined light contribution parameter value is determined based on the sum of the light contribution parameter values of the reference pixels.

The total light is a total amount of light contributed by the reference pixels corresponding to the target pixel to the target pixel.

For each target pixel in the lightmap, the computer device may determine, based on the light contribution parameter value of each reference pixel corresponding to the target pixel and the light data recorded for the reference pixel in the lightmap, the total light contributed by the reference pixels to the target pixel. The computer device may determine the combined light contribution parameter value based on the sum of the light contribution parameter values of the reference pixels, and perform, based on the ratio of the total light to the combined light contribution parameter value, noise reduction on the light data recorded for the target pixel in the lightmap, to obtain the noise-reduced lightmap.

Also, the computer device may use the sum of the light contribution parameter values of the reference pixels as the combined light contribution parameter value.

The computer device may, in some instances, use the ratio of the total light to the combined light contribution parameter value as light data after noise reduction for the target pixel, and replace the light data recorded for the target pixel in the lightmap with the light data after noise reduction for the target pixel, to obtain the noise-reduced lightmap.

Moreover, the noise reduction for the lightmap may be a plurality of rounds of noise reduction. Specifically, for each target pixel in the to-be-noise-reduced lightmap, the computer device may determine the noise reduction reference region corresponding to the target pixel in this round of noise reduction. For each reference pixel, the distance in the three-dimensional space between the reference pixel and the target pixel is determined. The distance influence parameter value of the reference pixel on the target pixel is determined based on the distance. The normal influence parameter value is determined based on the normal of the target pixel and the normal of the reference pixel. The brightness influence parameter value is determined based on the brightness of the target pixel and the brightness of the reference pixel. Further, the computer device may determine the light contribution parameter value of the reference pixel to the target pixel based on the distance influence parameter value, the normal influence parameter value, and the brightness influence parameter value. The computer device may determine, based on the light contribution parameter value of each reference pixel and the light data recorded for the reference pixel in the lightmap, the total light contributed by the reference pixels to the target pixel, and perform, based on the ratio of the total light to the combined light contribution parameter value, noise reduction on the light data recorded for the target pixel in the lightmap, to obtain the noise-reduced lightmap in this round. The computer device may use the noise-reduced lightmap in this round as the to-be-noise-reduced lightmap in the next round, and return, using the next round as a new round, to the step of determining, for each target pixel in the to-be-noise-reduced lightmap, the noise reduction reference region corresponding to the target pixel in this round of noise reduction for iterative noise reduction, until the iteration stopping condition is met, to obtain the noise-reduced lightmap for the to-be-noise-reduced lightmap.

In various aspects of the disclosure, the light data of the target pixel in the lightmap after each round of noise reduction may be calculated in the following manner:

$$c_{i+1}(p) = \frac{\sum_{q \in \Omega} w_i(p, q) \cdot c_i(q)}{\sum_{q \in \Omega} w_i(p, q)}$$

$$w_i(p, q) = w_d \cdot w_n \cdot w_l$$

$$w_d = \exp\left(-\frac{Dis(p, q)}{\sigma_d}\right)$$

$$w_n = \max(0, n(p) \cdot n(q))^{\sigma_n}$$

$$w_l = \exp\left(-\frac{|l_i(p) - l_i(q)|}{\sigma_l \sqrt{g_{3 \times 3}(\mathrm{Var}(l_i(p))) + \varepsilon}}\right)$$

Herein, p represents a target pixel, q represents a reference pixel, $\Omega$ represents a noise reduction reference region, i represents a previous round of noise reduction, i+1 represents this round of noise reduction, $\sigma_d$, $\sigma_n$, $\sigma_l$, and $\varepsilon$ are preset constants and may be selected based on a test effect, $Dis(p,q)$ is a distance in three-dimensional space between the reference pixel and the target pixel, $n(p)$ is a normal vector of the target pixel, $n(q)$ is a normal vector of the reference pixel, $l_i(p)$ is a brightness value of the target pixel after the previous round of noise reduction, $l_i(q)$ is a brightness value of the reference pixel after the previous round of noise reduction, Var represents a variance function, $g_{3 \times 3}$ represents a Gaussian function with a 3×3 filter kernel, $w_d$ represents a distance influence parameter value, $w_n$ represents a normal influence parameter value, $w_i$ represents a brightness influence parameter value, $w_i(p,q)$ represents a light contribution parameter value of the reference pixel to the target pixel after the previous round of noise reduction, $c_i(q)$ represents light data recorded for the reference pixel in the lightmap after the previous round of noise reduction, and $c_{i+1}(p)$ represents light data recorded for the target pixel in the lightmap after this round of noise reduction.

Aspects of this disclosure provide a parameter configuration interface for noise reduction on a lightmap. As shown in FIG. 8, if a user checks "light leakage prevention", a light leakage prevention effect can be achieved. The user may further adjust the three constants $\sigma_d$, $\sigma_n$, and $\sigma_l$ in the foregoing formulas correspondingly by modifying a "direct light smoothing parameter" and an "indirect light smoothing parameter", to control a noise reduction degree for the lightmap.

In the foregoing aspects, the total light contributed by the reference pixels to the target pixel is determined based on the light contribution parameter value of each reference pixel and the light data recorded for the reference pixel in the lightmap, and noise reduction is performed on the light data of the target pixel based on the ratio of the total light to the combined light contribution parameter value, which can further improve a noise reduction effect for the lightmap, thereby further improving the quality of an image obtained by performing light rendering based on the lightmap.

This disclosure also includes: obtaining an initial lightmap; determining, for each pixel in the initial lightmap, a pixel within a preset neighborhood range of the pixel as a neighborhood pixel of the pixel; obtaining a brightness value of each neighborhood pixel of the pixel based on the initial lightmap; determining a brightness range of the pixel based on the brightness value of each neighborhood pixel of the pixel; obtaining a brightness value of the pixel; and adjusting, in a case that the brightness value of the pixel exceeds the brightness range, the brightness value of the pixel to be within a target brightness range, to obtain the lightmap.

The computer device may obtain the initial lightmap; determine, for each pixel in the initial lightmap, the target brightness range of the pixel based on the brightness value of each neighborhood pixel corresponding to the pixel, the neighborhood pixel being a pixel in the preset neighborhood range of the pixel; and adjust, for the pixel with the brightness value not within the target brightness range, the brightness value of the pixel to be within the target brightness range, to obtain the to-be-noise-reduced lightmap.

The initial lightmap is a lightmap that has not been adjusted for the brightness value at the beginning.

The computer device may obtain the initial lightmap. The computer device may determine, for each pixel in the initial lightmap, the target brightness range of the pixel based on the brightness value of each neighborhood pixel corresponding to the pixel. The computer device may adjust, for the pixel with the brightness value not within the target brightness range, the brightness value of the pixel to be within the corresponding target brightness range, to obtain the to-be-noise-reduced lightmap.

In many cases, the computer device may determine, for each pixel in the initial lightmap, a brightness mean and a brightness variance of the pixel within the corresponding preset neighborhood range based on the brightness value of each neighborhood pixel corresponding to the pixel. Further, the computer device may determine the target brightness range of the pixel based on the brightness mean and the brightness variance of the pixel.

In various aspects of the disclosure, for each pixel in the initial lightmap, if the brightness mean is E and the brightness variance is D for the pixel within the corresponding preset neighborhood range (for example, 7*7), the target brightness range of the pixel may be [E−kD, E+kD], where k represents a degree of allowable deviation from the mean, and k may be within the range [1, 3]. It may be understood that if the brightness value of the pixel is less than E−kD or greater than E+kD, the computer device may adjust the brightness value of the pixel to be within the range [E−kD, E+kD]. For example, if the brightness value of the pixel is less than E−kD, the brightness value of the pixel may be adjusted to E−kD; or if the brightness value of the pixel is greater than E+kD, the brightness value of the pixel may be adjusted to E+kD.

In the foregoing aspects, the brightness value of the pixel is not within the target brightness range, indicating that the pixel has excessively high or low brightness compared with the brightness of the surrounding pixels, which is an abnormal pixel. For the pixel with the brightness value not within the target brightness range, the brightness value of the pixel is adjusted to be within the target brightness range. The brightness of the abnormal pixel can be adjusted to be close to the brightness of the surrounding pixels, which can avoid the excessively bright or dark abnormal pixel from spreading into a bright or dark region in the subsequent noise reduction on the lightmap, thereby improving a noise reduction effect for the lightmap.

Figures 9, 10, 11:
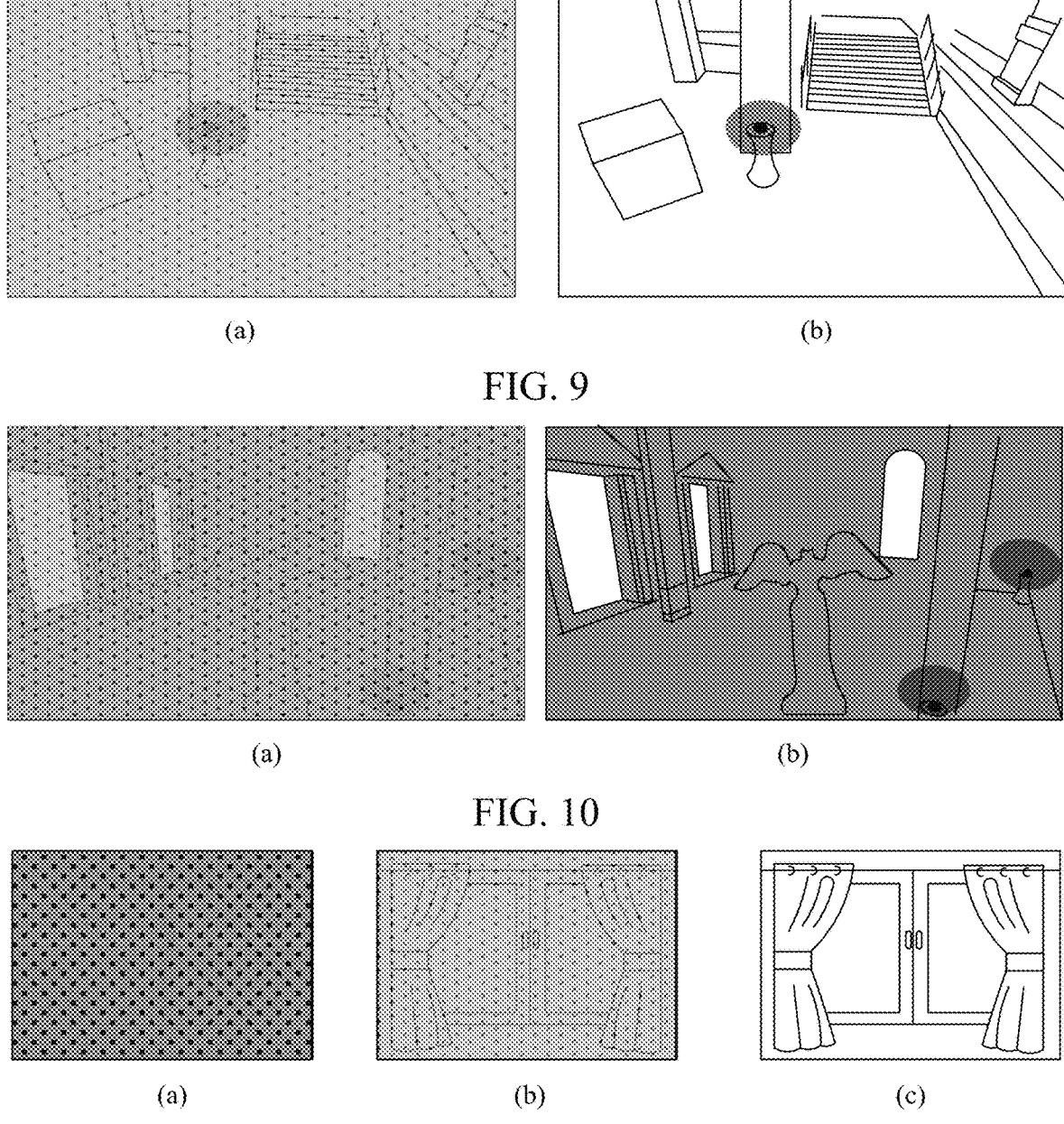
FIG. 9 is an example schematic diagram of comparison between scene images according to various aspects of the disclosure.
FIG. 10 is an example schematic diagram of comparison between scene images according to various aspects of the disclosure.
FIG. 11 is a an example schematic diagram of comparison between scene images according to various aspects of the disclosure.

As shown in FIG. 9, (a) shows a scene image obtained without adjustment on the brightness value of the abnormal pixel, that is, obtained through rendering directly based on the lightmap obtained by performing noise reduction on the initial lightmap, and apparently, the obtained scene image is poor in quality; and (b) shows a scene image obtained with adjustment on the brightness value of the abnormal pixel according to this application, that is, obtained through rendering based on the lightmap obtained after the brightness value of the abnormal pixel in the initial lightmap is adjusted, and apparently, the quality of the scene image in (b) is greatly improved compared with (a).

I FIG. 10, (a) shows a scene image obtained through rendering directly based on the lightmap before noise reduction, and apparently, the obtained scene image is poor in quality; and (b) shows a scene image obtained through rendering based on the lightmap after noise reduction by using the noise reduction method of a lightmap in this application, and apparently, the quality of the scene image in (b) is greatly improved compared with (a).

FIG. 11, (a) shows a curtain scene image obtained through rendering directly based on the lightmap before noise reduction, and apparently, the obtained scene image is poor in quality; (b) shows a curtain scene image obtained through rendering based on the lightmap after noise reduction by using a conventional noise reduction method of a lightmap, which still has more noise left, but reduced compared with (a); and (c) shows a curtain scene image obtained through rendering based on the lightmap after noise reduction by using the noise reduction method of a lightmap in this application, and apparently, the quality of the curtain scene image in (c) is greatly improved compared with (a) and (b).

Figure 12:
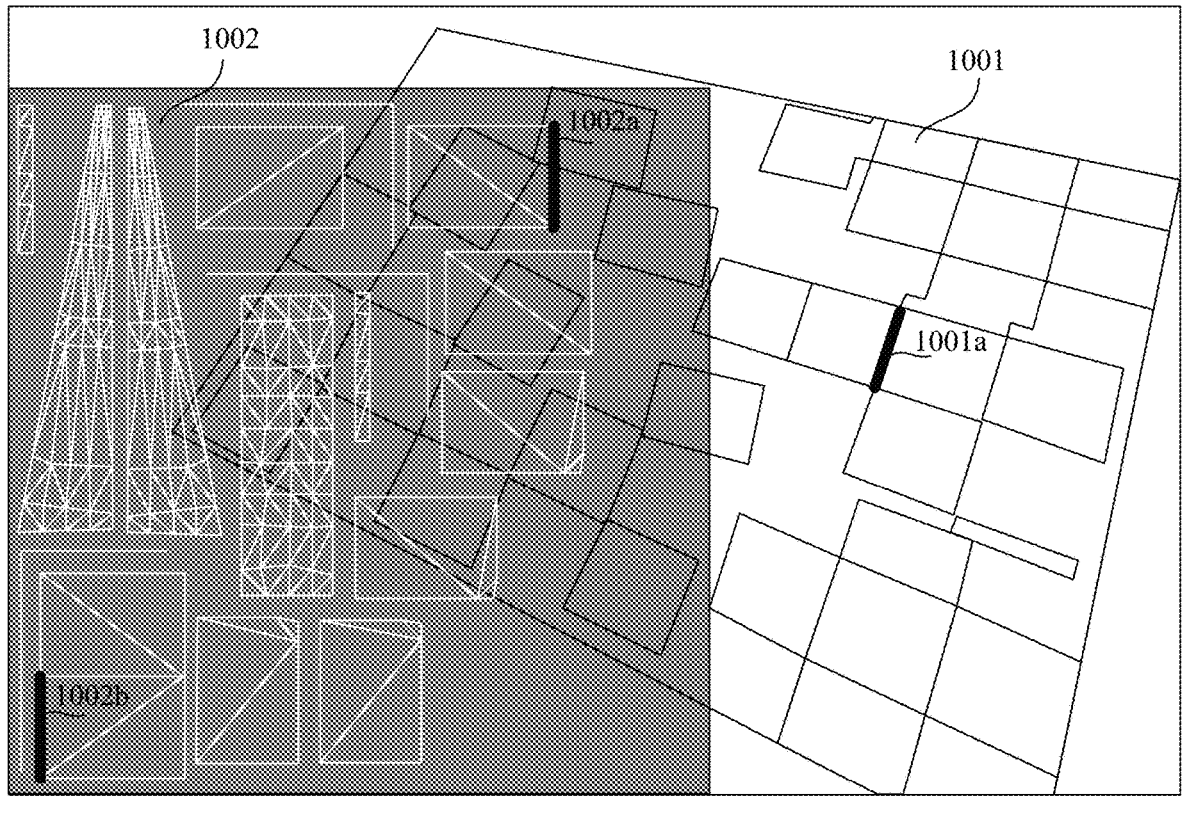
FIG. 12 is an example schematic diagram of a lightmap corresponding to a flat plate according to various aspects of the disclosure.

FIG. 12, 1001 shows a flat plate (that is, a three-dimensional virtual model) in a virtual scene in three-dimensional space, and 1002 shows a lightmap obtained by performing UV splitting on the flat plate. Compared with an ordinary image, the lightmap has specific characteristics. For example, in the three-dimensional space, 1001a is one region in the flat plate. After the flat plate is split, in the lightmap 1002 of the flat plate, 1001a is split into two parts 1002a and 1002b in different UV islands.

Figure 13:
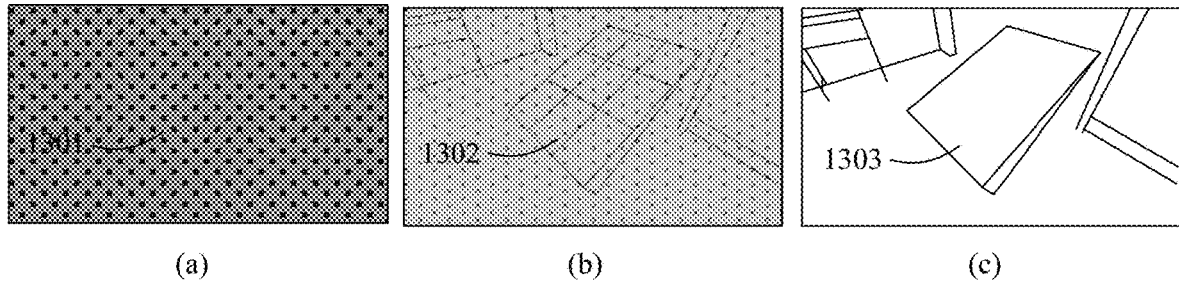
FIG. 13 is an example schematic diagram of comparison between scene images according to various aspects of the disclosure.

As shown in FIG. 13, (a) shows a scene image of a flat plate that is obtained through rendering directly based on the lightmap before noise reduction, and apparently, the obtained scene image is poor in quality; (b) shows a scene image of a flat plate that is obtained through rendering based on the lightmap after noise reduction by using a conventional noise reduction method of a lightmap, which still has more noise left, but reduced compared with (a), and the denoised flat plate is divided into a plurality of different regions with significant seam defects, which seriously affects the image quality; and (c) shows a scene image of a flat plate that is obtained through rendering based on the lightmap after noise reduction by using the noise reduction method of a lightmap in this application, apparently, the quality of the scene image of the flat plate in (c) is greatly improved compared with (a) and (b), and compared with the flat plate 1302 in (b), the flat plate 1303 in (c) is still a complete flat plate after denoising, different from the flat plate 1301 in (a), which avoids seam defects.

As shown in FIG. 14, a noise reduction method of a lightmap is provided. The method may be applied to a computer device. The computer device may be a terminal or a server. The method may be implemented by the terminal or the server alone, or may be implemented through inter-action between the terminal and the server. This example uses an example in which the method is applied to a computer device for description. The method specifically includes the following steps:

Step 1402: Obtain a lightmap, and determine, by using each pixel in the lightmap as a target pixel, a noise reduction reference region corresponding to the target pixel in this round of noise reduction, the noise reduc-tion reference region including at least one reference pixel for noise reduction reference.

The noise reduction reference region corresponding to the target pixel may be determined based on a sampling range of a first filter kernel in each of previous preset rounds of noise reduction; the noise reduction reference region corre-sponding to the target pixel is determined based on a sampling range of a second filter kernel in each round of noise reduction after the previous preset rounds; and the sampling range of the first filter kernel is smaller than the sampling range of the second filter kernel.

Step 1404: Determine a light contribution distance cor-responding to the target pixel in each of a plurality of preset directions, a pixel within the light contribution distance making a light contribution to the target pixel.

Step 1406: For each reference pixel, if a pixel distance in two-dimensional space between the reference pixel and the target pixel does not exceed the light contribution distance, determine, for each reference pixel, a distance in three-dimensional space between the reference pixel and the target pixel.

Step 1408: Determine a distance representation parameter value based on the distance and a preset distance adjustment parameter value. The distance representa-tion parameter value indicates a distance in the three-dimensional space between the reference pixel and the target pixel.

Step 1410: Determine a distance influence parameter value of the reference pixel on the target pixel based on the distance representation parameter value. The dis-tance influence parameter value indicates an influence of the distance on a light contribution.

Step 1412: Determine at least one of a normal influence parameter value or a brightness influence parameter value.

The normal influence parameter value indicates influ-ences of a normal of the target pixel and a normal of the reference pixel on a light contribution. The brightness influ-ence parameter value indicates influences of brightness of the target pixel and brightness of the reference pixel on a light contribution. The normal influence parameter value is determined based on the normal of the target pixel and the normal of the reference pixel. The brightness influence parameter value is determined based on the brightness of the target pixel and the brightness of the reference pixel.

Step 1414: Determine a light contribution parameter value of the reference pixel to the target pixel based on the distance influence parameter value and at least one of the normal influence parameter value or the brightness influence parameter value.

Step 1416: If the pixel distance in the two-dimensional space between the reference pixel and the target pixel exceeds the light contribution distance, determine that the reference pixel makes no light contribution to the target pixel.

Step 1418: Determine, based on the light contribution parameter value of each reference pixel and light data recorded for the reference pixel in the lightmap, total light contributed by reference pixels to the target pixel.

Step 1420: Perform, based on a ratio of the total light to a combined light contribution parameter value, noise reduction on light data recorded for the target pixel in the lightmap, to obtain a noise-reduced lightmap in this round. The combined light contribution parameter value is determined based on a sum of light contribu-tion parameter values of the reference pixels.

Step 1422: Use the noise-reduced lightmap in this round as a to-be-noise-reduced lightmap in a next round, and return, using the next round as a new round, to the step of determining, for each target pixel in the to-be-noise-reduced lightmap, the noise reduction reference region corresponding to the target pixel in this round of noise reduction for iterative noise reduction, until an iteration stopping condition is met, to obtain a noise-reduced lightmap for the to-be-noise-reduced lightmap.

This application further provides an application scenario, and the noise reduction method of a lightmap is applied to the application scenario. Specifically, the noise reduction method of a lightmap may be applied to a scenario of rendering of a three-dimensional virtual object in a game field. It may be understood that noise reduction needs to be performed on the lightmap corresponding to the three-dimensional virtual object before the three-dimensional vir-tual object is rendered based on the lightmap. For each target pixel in the to-be-noise-reduced lightmap corresponding to the three-dimensional virtual object, the computer device may determine the noise reduction reference region corre-sponding to the target pixel in this round of noise reduction, the noise reduction reference region including at least one reference pixel for noise reduction reference. The light contribution distance corresponding to the target pixel in each of the plurality of preset directions is determined, a pixel within the light contribution distance making a light contribution to the target pixel.

For each reference pixel, if the pixel distance in the two-dimensional space between the reference pixel and the target pixel does not exceed the light contribution distance, the computer device may determine, for each reference pixel, the distance in the three-dimensional space between the reference pixel and the target pixel. The distance repre-sentation parameter value is determined based on the dis-tance and the preset distance adjustment parameter value. The distance representation parameter value indicates a distance in the three-dimensional space between the refer-ence pixel and the target pixel.

The distance influence parameter value of the reference pixel on the target pixel is determined based on the distance representation parameter value. The distance influence parameter value indicates an influence of the distance on a light contribution. At least one of the normal influence parameter value or the brightness influence parameter value is determined. The normal influence parameter value indi-cates influences of a normal of the target pixel and a normal of the reference pixel on a light contribution. The brightness influence parameter value indicates influences of brightness of the target pixel and brightness of the reference pixel on a light contribution. The normal influence parameter value is determined based on the normal of the target pixel and the normal of the reference pixel. The brightness influence parameter value is determined based on the brightness of the target pixel and the brightness of the reference pixel. The light contribution parameter value of the reference pixel to the target pixel is determined based on the distance influence parameter value and at least one of the normal influence parameter value or the brightness influence parameter value. If the pixel distance in the two-dimensional space between the reference pixel and the target pixel exceeds the light contribution distance, it is determined that the reference pixel makes no light contribution to the target pixel.

The computer device may determine, based on the light contribution parameter value of each reference pixel and the light data recorded for the reference pixel in the lightmap corresponding to the three-dimensional virtual object, the total light contributed by the reference pixels to the target pixel. Based on the ratio of the total light to the combined light contribution parameter value, noise reduction is performed on the light data recorded for the target pixel in the lightmap, to obtain the noise-reduced lightmap corresponding to the three-dimensional virtual object in this round. The combined light contribution parameter value is determined based on a sum of light contribution parameter values of the reference pixels.

The computer device may use the noise-reduced lightmap corresponding to the three-dimensional virtual object in this round as the to-be-noise-reduced lightmap corresponding to the three-dimensional virtual object in the next round, and return, using the next round as a new round, to the step of determining, for each target pixel in the to-be-noise-reduced lightmap corresponding to the three-dimensional virtual object, the noise reduction reference region corresponding to the target pixel in this round of noise reduction for iterative noise reduction, until the iteration stopping condition is met, to obtain the noise-reduced lightmap for the to-be-noise-reduced lightmap corresponding to the three-dimensional virtual object. Further, the computer device may render the three-dimensional virtual object based on the lightmap corresponding to the three-dimensional virtual object.

This application further provides another application scenario, and the noise reduction method of a lightmap is applied to the application scenario. Specifically, the noise reduction method of a lightmap may also be applied to scenarios such as special effects for films and television, visualization design, virtual reality (VR), industrial simulation, and digital culture and creativity. It may be understood that rendering on a virtual object based on the lightmap is involved in the scenarios such as special effects for films and television, visualization design, virtual reality (VR), industrial simulation, and digital culture and creativity, and noise reduction needs to be performed on the lightmap corresponding to the virtual object before the virtual object is rendered, to improve the quality of a rendered image.

It is to be understood that, although the steps are displayed sequentially in the flowcharts of the aspects, these steps are not necessarily performed sequentially. Unless otherwise explicitly specified in this application, implementation of these steps is not strictly limited, and these steps may be implemented in other sequences. Moreover, at least some of the example steps it is possible to include a plurality of sub-steps or a plurality of stages. The sub-steps or stages are not necessarily performed at the same moment but may be performed at different moments. The sub-steps or stages are not necessarily performed sequentially, but may be performed alternately with other steps or at least some of sub-steps or stages of other steps.

Figure 15:
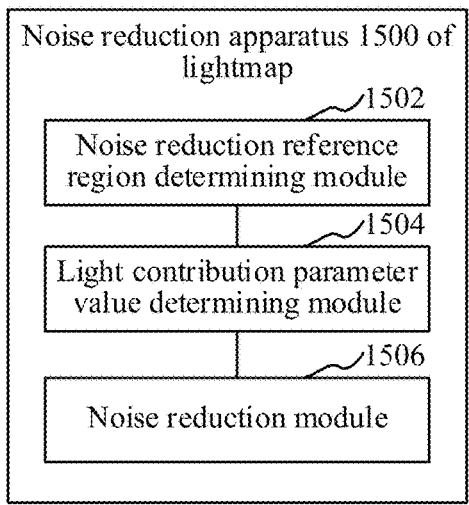
FIG. 15 is an example block diagram of a structure of a noise reduction apparatus of a lightmap according to various aspects of the disclosure.

FIG. 15 shows an example noise reduction apparatus 1500 of a lightmap is provided. The apparatus may be implemented as a part of a computer device by a software module, a hardware module, or a combination thereof. The apparatus specifically includes:

a noise reduction reference region determining module 1502, configured to obtain a lightmap; and determine, by using each pixel in the lightmap as a target pixel, a noise reduction reference region corresponding to the target pixel in the lightmap, the noise reduction reference region including a reference pixel for noise reduction reference;

a light contribution parameter value determining module 1504, configured to determine a distance in three-dimensional space between the reference pixel and the target pixel; and determine a light contribution parameter value of the reference pixel to the target pixel based on the distance; and a noise reduction module 1506, configured to obtain light data recorded for the reference pixel in the lightmap; and perform, based on the light contribution parameter value and the light data of the reference pixel, noise reduction on light data recorded for the target pixel in the lightmap, to obtain a noise-reduced lightmap.

The noise reduction reference region determining module 1502 and the light contribution parameter value determining module 1504 may be collectively referred to as a determining module. The determining module may have functions of the noise reduction reference region determining module 1502 and the light contribution parameter value determining module 1504.

In some instances, the noise reduction is performed iteratively, and a light image obtained in each round of iteration is a lightmap noise-reduced in a previous round of iteration.

The noise reduction reference region determining module 1502 may further be configured to obtain a lightmap noise-reduced in a previous round, and determine, for each target pixel in the lightmap noise-reduced in the previous round, a noise reduction reference region corresponding to the target pixel in this round of noise reduction.

The light contribution parameter value determining module 1504 is further configured to: determine, for each reference pixel in the noise reduction reference region corresponding to the target pixel in this round of noise reduction, a distance in three-dimensional space between the reference pixel and the target pixel, and determine a light contribution parameter value of the reference pixel to the target pixel based on the distance.

The noise reduction module 1506 is further configured to obtain light data recorded for the reference pixel in the lightmap noise-reduced in the previous round, and perform, based on the light contribution parameter value and the light data of the reference pixel, noise reduction on light data recorded for the target pixel in the lightmap, to obtain a noise-reduced lightmap in this round.

Also, the noise reduction reference region may be determined based on a sampling range of a first filter kernel in each of preset rounds of iteration starting from the first round, the noise reduction reference region is determined based on a sampling range of a second filter kernel in each round of iteration after the preset rounds of iteration starting from the first round, and the sampling range of the first filter kernel is smaller than the sampling range of the second filter kernel.

The light contribution parameter value determining module 1504 may be further configured to determine a distance influence parameter value of the reference pixel on the target pixel based on the distance, and determine the light contribution parameter value based on the distance influence parameter value. The distance influence parameter value indicates an influence of the distance on a light contribution.

Additionally, the light contribution parameter value determining module 1504 may be further configured to obtain a preset distance adjustment parameter value; determine a distance representation parameter value based on the distance and the distance adjustment parameter value; and determine the distance influence parameter value of the reference pixel on the target pixel based on the distance representation parameter value. The distance representation parameter value indicates a distance in the three-dimensional space between the reference pixel and the target pixel.

In some instances, the light contribution parameter value determining module 1504 may also be further configured to obtain at least one of a normal influence parameter value or a brightness influence parameter value; and determine the light contribution parameter value of the reference pixel to the target pixel based on the distance influence parameter value and at least one of the normal influence parameter value or the brightness influence parameter value.

The normal influence parameter value indicates influences of a normal of the target pixel and a normal of the reference pixel on a light contribution; the brightness influence parameter value indicates influences of brightness of the target pixel and brightness of the reference pixel on a light contribution; the normal influence parameter value is determined based on the normal of the target pixel and the normal of the reference pixel; and the brightness influence parameter value is determined based on the brightness of the target pixel and the brightness of the reference pixel.

The light contribution parameter value determining module 1504 may, according to various aspects of the disclosure, be further configured to determine a light contribution distance corresponding to the target pixel in each of a plurality of preset directions; and determine, for each reference pixel, in a case that a pixel distance in two-dimensional space between the reference pixel and the target pixel does not exceed the light contribution distance, the distance in the three-dimensional space between the reference pixel and the target pixel, and determine the light contribution parameter value of the reference pixel to the target pixel based on the distance. A pixel within the light contribution distance makes a light contribution to the target pixel.

In various aspects of the disclosure, the light contribution parameter value determining module 1504 is further configured to determine, in a case that the pixel distance in the two-dimensional space between the reference pixel and the target pixel exceeds the light contribution distance, that the reference pixel makes no light contribution to the target pixel.

Also, the light contribution parameter value determining module 1504 may be further configured to perform occlusion pixel detection in each of the plurality of preset directions of the target pixel using the target pixel as a start point; and obtain, in a case that an occluded pixel is detected in any preset direction, a pixel distance between the target pixel and the occluded pixel detected in the direction, and determine the light contribution distance corresponding to the target pixel in the preset direction based on the obtained pixel distance.

The light contribution parameter value determining module 1504 may further be configured to determine a pixel in an occluded state in the lightmap, and add an occlusion marker to the pixel in the occluded state in the lightmap.

The light contribution parameter value determining module 1504 is further configured to obtain, in a case that the pixel with the occlusion marker is detected in the lightmap in any preset direction, a pixel distance between the target pixel and the detected pixel with the occlusion marker, and determine the light contribution distance corresponding to the target pixel in the preset direction based on the obtained pixel distance.

The lightmap may be obtained by performing two-dimensional splitting on a three-dimensional virtual model in a virtual scene in three-dimensional space; and the light contribution parameter value determining module 1504 is further configured to correspondingly determine, for each pixel in the lightmap, from the virtual scene in the three-dimensional space, a geometric surface that intersects a plurality of rays starting from the pixel at the shortest distance; and determine the pixel in the occluded state from pixels in the lightmap based on a relationship between a direction of a normal of the pixel and a direction of a normal of the correspondingly determined geometric surface.

Noise reduction module 1506 may be further configured to determine, based on the light contribution parameter value of each reference pixel and the light data recorded for each reference pixel, total light contributed by reference pixels to the target pixel; obtain a combined light contribution parameter value, the combined light contribution parameter value being determined based on a sum of light contribution parameter values of the reference pixels; and perform, based on a ratio of the total light to the combined light contribution parameter value, noise reduction on the light data recorded for the target pixel in the lightmap, to obtain the noise-reduced lightmap.

The noise reduction apparatus of a lightmap may further include: a preprocessing module, configured to obtain an initial lightmap; determine, for each pixel in the initial lightmap, a pixel within a preset neighborhood range of the pixel as a neighborhood pixel of the pixel; obtain a brightness value of each neighborhood pixel of the pixel based on the initial lightmap; determine a brightness range of the pixel based on the brightness value of each neighborhood pixel of the pixel; obtain a brightness value of the pixel; and adjust, in a case that the brightness value of the pixel exceeds the brightness range, the brightness value of the pixel to be within a target brightness range, to obtain the lightmap.

By using the noise reduction apparatus 1500 of a lightmap, for each target pixel in a to-be-noise-reduced lightmap, a noise reduction reference region corresponding to the target pixel in the lightmap is determined. The noise reduction reference region includes at least one reference pixel for noise reduction reference. For each reference pixel, a distance in three-dimensional space between the reference pixel and the target pixel is determined. The distance in the three-dimensional space between the reference pixel and the target pixel may directly and accurately indicate relative locations of the reference pixel and the target pixel in the three-dimensional space. Therefore, a light contribution parameter value of the reference pixel to the target pixel is determined based on the distance, which can increase the accuracy of the light contribution parameter value. Further, noise reduction is performed on light data recorded for the target pixel in the lightmap based on the accurate light contribution parameter value of each reference pixel and light data recorded for the reference pixel in the lightmap, which can improve a noise reduction effect for the lightmap to obtain a lightmap that can avoid scam defects, thereby improving the quality of an image obtained by performing light rendering based on the lightmap.

Each module in the noise reduction apparatus of a lightmap may be implemented entirely or partially by software, hardware, or a combination thereof. Each module may be embedded in or independent of a processor in a computer device in a hardware form, or may be stored in a memory in a computer device in a software form, to facilitate the processor to call the module to perform an operation corresponding to the module.

Figure 16:
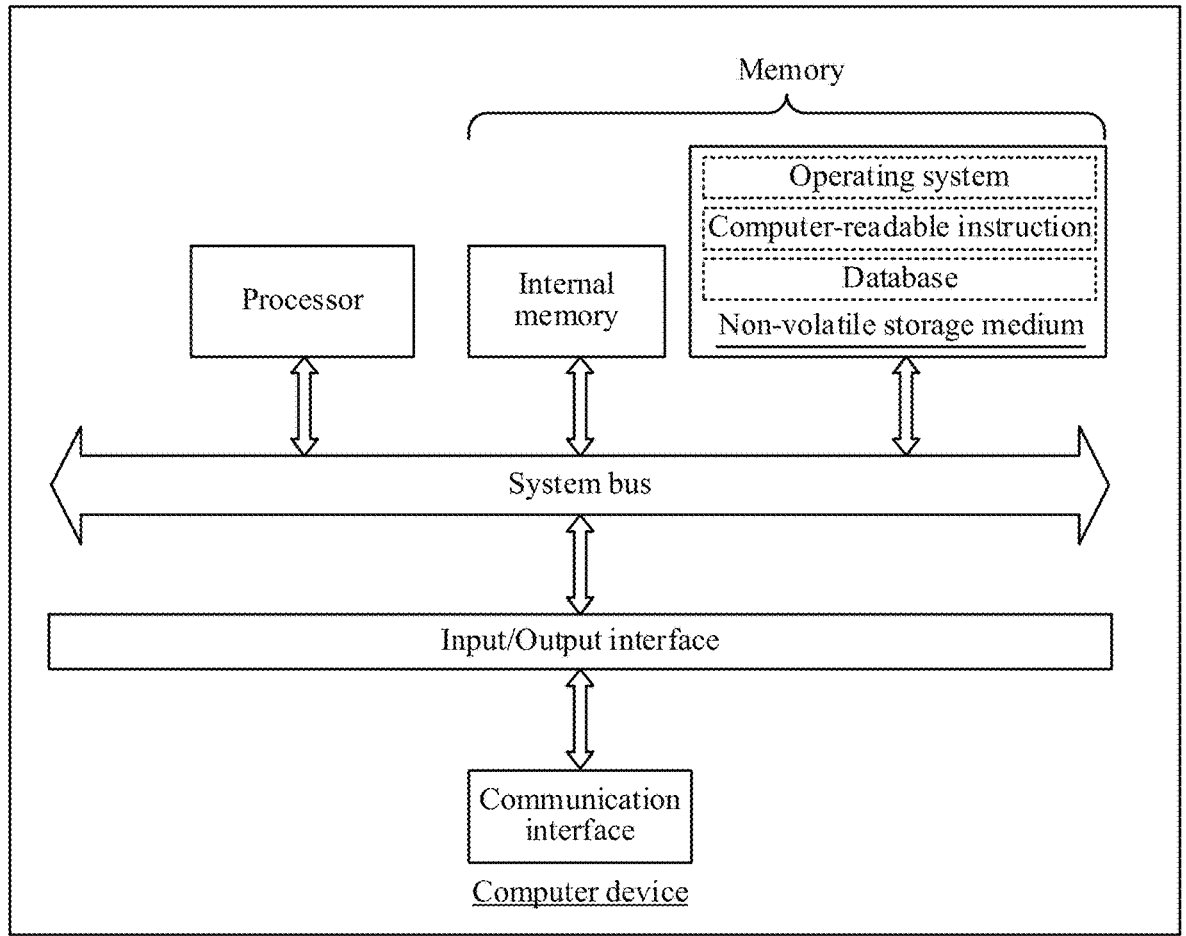
FIG. 16 is a diagram showing an example of an internal structure of a computer device according to various aspects of the disclosure.

FIG. 16 shows an example computer device that may be used to implement various aspects of the disclosure. The computer device includes a processor, a memory, an input/output (I/O) interface, and a communication interface. The processor, the memory, and the input/output interface are connected by a system bus. The communication interface is connected to the system bus through the input/output interface. The processor of the computer device is configured to provide computation and control capabilities. The memory of the computer device includes a non-volatile storage medium and an internal memory. The non-volatile storage medium stores an operating system, computer-readable instructions, and a database. The internal memory provides an environment for running the operating system and the computer-readable instructions in the non-volatile storage medium. The input/output interface of the computer device is configured to exchange information between the processor and an external device. The communication interface of the computer device is configured to connect to and communicate with an external terminal through a network. The computer-readable instructions are executed by the processor to implement a noise reduction method of a lightmap.

Figure 17:
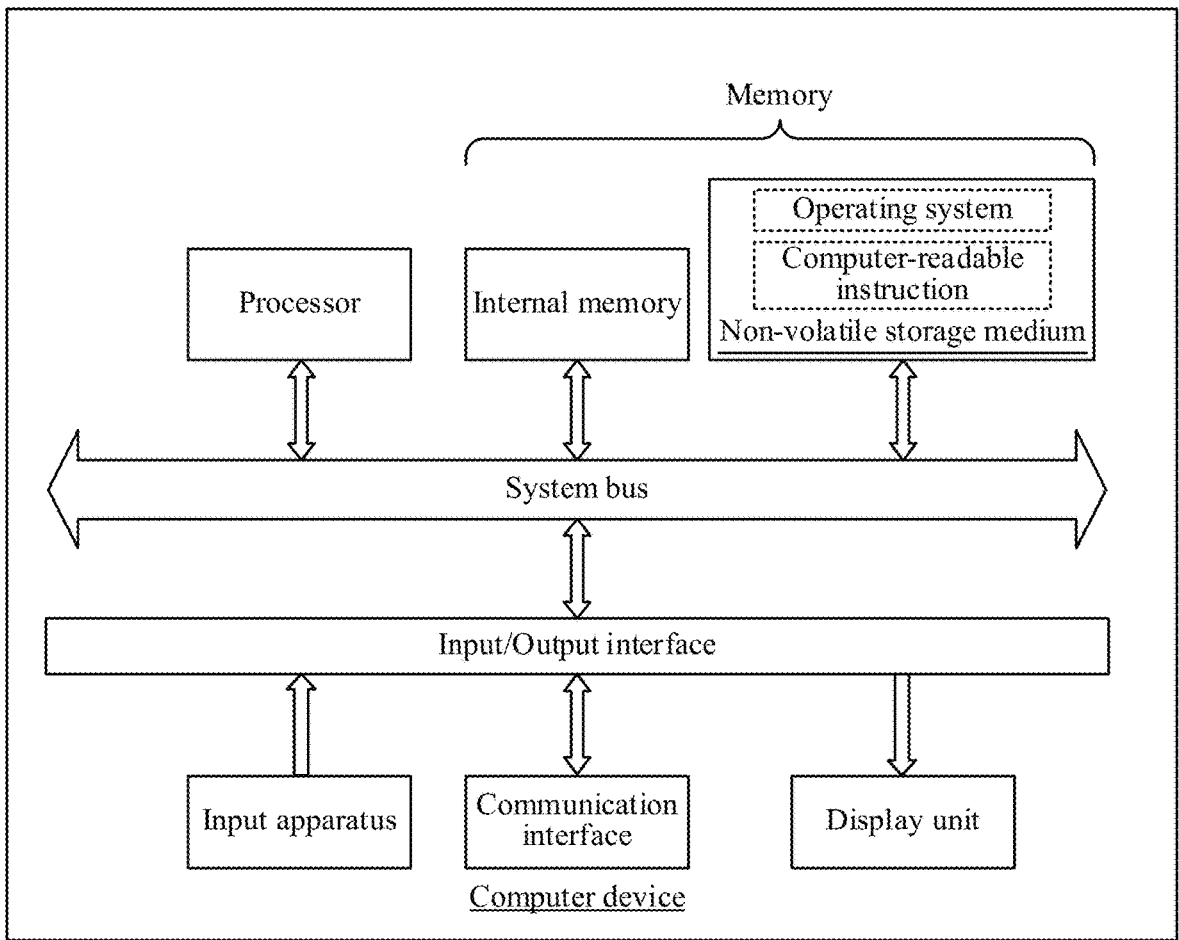
FIG. 17 is a diagram of an example internal structure of a computer device according to various aspects of the disclosure.

FIG. 17 shows an example computer device that may be used to implement various aspects of the disclosure. The computer device includes a processor, a memory, an input/output interface, a communication interface, a display unit, and an input apparatus. The processor, the memory, and the input/output interface are connected by a system bus. The communication interface, the display unit, and the input apparatus are connected to the system bus through the input/output interface. The processor of the computer device is configured to provide computation and control capabilities. The memory of the computer device includes a non-volatile storage medium and an internal memory. The non-volatile storage medium stores an operating system and computer-readable instructions. The internal memory provides an environment for running the operating system and the computer-readable instructions in the non-volatile storage medium. The input/output interface of the computer device is configured to exchange information between the processor and an external device. The communication interface of the computer device is configured to communicate with an external terminal in a wired or wireless manner. The wireless manner may be implemented by Wi-Fi, a mobile cellular network, near field communication (NFC), or other technology. The computer-readable instructions are executed by the processor to implement a noise reduction method of a lightmap. The display unit of the computer device is configured to form a visible picture and may be a display screen, a projection apparatus, or a virtual reality imaging device. The display screen may be a liquid crystal display screen or an e-ink display screen. The input apparatus of the computer device may be a touch layer covering the display screen, or may be a button, a trackball, or a touchpad disposed on a housing of the computer device, or may be an external keyboard, a touchpad, a mouse, or the like.

A person skilled in the art may understand that the structures shown in FIG. 16 and FIG. 17 are merely block diagrams of a partial structure related to a solution in this application, and does not constitute a limitation to the computer device to which the solution in this application is applied. Specifically, the computer device may include more or fewer components than those shown in the figures, or have some components combined, or have a different component deployment.

The described computer devices may include a memory and a processor. The memory stores computer-readable instructions, and the processor executes the computer-readable instructions to implement the steps in the foregoing method aspects.

This disclosure includes the concept of a computer-readable storage medium that is capable of storing computer-readable instructions. The computer-readable instructions are executed by a processor to implement the steps in the foregoing method aspects.

This disclosure also includes the concept of a computer program product with computer-readable instructions. The computer-readable instructions are executed by a processor to implement the steps in the foregoing method aspects.

The user information (including, but not limited to, user device information and user personal information) and data (including, but not limited to, data for analysis, data stored, and data presented) involved in this application are all authorized by the user or fully authorized by all parties, and the collection, use, and processing of relevant data need to comply with relevant laws, regulations, and standards of relevant countries and regions.

A person of ordinary skill in the art may understand that all or some of procedures of the method in the foregoing aspects may be implemented by computer-readable instructions instructing relevant hardware. The computer-readable instructions may be stored in a non-volatile computer-readable storage medium. When the computer-readable instructions are executed, the procedures of the method in the foregoing aspects may be included. References to the memory, the storage, the database, or another medium used in the aspects provided in this application may all include at least one of a non-volatile memory and a volatile memory. The non-volatile memory may include a read-only memory (ROM), a magnetic tape, a floppy disk, a flash memory, an optical memory, or the like. The volatile memory may include a random access memory (RAM) or an external cache. As an illustration but not a limitation, the RAM may be in various forms, such as a static random access memory (SRAM) or a dynamic random access memory (DRAM).

The technical features of the foregoing aspects can be randomly combined. To make the description concise, all possible combinations of the technical features of the foregoing aspects have not been described. However, as long as there is no contradiction in the combinations of these technical features, the combinations have to be considered as the scope described in this specification.

The foregoing aspects only describe several implementations of this application, which are described specifically and in detail, but cannot be construed as a limitation to the patent scope of this application. For a person of ordinary skill in the art, several transformations and improvements can be made without departing from the concept of this application. These transformations and improvements fall within the protection scope of this application. Therefore, the protection scope of this application shall be subject to the appended claims.

What is claimed is:

1. A method comprising:

determining, by using each pixel in a lightmap as a target pixel, a noise reduction reference region corresponding to the target pixel in the lightmap, the noise reduction reference region comprising a reference pixel for noise reduction reference;

determining a distance in three-dimensional space between the reference pixel and the target pixel;

determining a light contribution parameter value of the reference pixel to the target pixel based on the distance;

obtaining light data recorded for the reference pixel in the lightmap;

reducing, based on the light contribution parameter value and the light data of the reference pixel, noise on light data recorded for the target pixel in the lightmap; and generating, based on the reducing, a noise-reduced lightmap.

2. The method of claim 1, further comprising performing the method a second time after performing the method a first time, wherein performing the method the second time includes producing a subsequent lightmap that is further noise-reduced as compared to the noise-reduced lightmap generated the first time.

3. The method of claim 2, wherein the noise reduction reference region is determined when performing the method the second time based on a sampling range of a second filter kernel, wherein the sampling range of the second filter kernel is greater than a sampling range of a first filter kernel used in reducing the noise when the method is performed the first time.

4. The method of claim 1, wherein the determining a light contribution parameter value of the reference pixel to the target pixel based on the distance comprises:

determining a distance influence parameter value of the reference pixel on the target pixel based on the distance; and determining the light contribution parameter value based on the distance influence parameter value.

5. The method according to claim 4, wherein the determining a distance influence parameter value of the reference pixel on the target pixel based on the distance comprises:

obtaining a preset distance adjustment parameter value;

determining a distance representation parameter value based on the distance and the distance adjustment parameter value; and determining the distance influence parameter value of the reference pixel on the target pixel based on the distance representation parameter value.

6. The method according to claim 4, wherein the determining the light contribution parameter value based on the distance influence parameter value comprises:

obtaining at least one of a normal influence parameter value or a brightness influence parameter value, the normal influence parameter value being determined based on a normal of the target pixel and a normal of the reference pixel, and the brightness influence parameter value being determined based on brightness of the target pixel and brightness of the reference pixel; and determining the light contribution parameter value of the reference pixel to the target pixel based on the distance influence parameter value and at least one of the normal influence parameter value or the brightness influence parameter value.

7. The method of claim 1, further comprising:

determining a light contribution distance corresponding to the target pixel in each of a plurality of preset directions, a pixel within the light contribution distance making a light contribution to the target pixel; and performing, for each reference pixel, in a case that a pixel distance in two-dimensional space between the reference pixel and the target pixel does not exceed the light contribution distance, the operations of determining a distance in three-dimensional space between the reference pixel and the target pixel and determining a light contribution parameter value of the reference pixel to the target pixel based on the distance.

8. The method according to claim 7, further comprising:

determining, in a case that the pixel distance in the two-dimensional space between the reference pixel and the target pixel exceeds the light contribution distance, that the reference pixel makes no light contribution to the target pixel.

9. The method according to claim 7, wherein the determining a light contribution distance corresponding to the target pixel in each of a plurality of preset directions comprises:

performing occlusion pixel detection in each of the plurality of preset directions of the target pixel using the target pixel as a start point;

detecting, based on the pixel occlusion detection, a pixel distance between the target pixel and an occluded pixel detected in the direction; and and determining the light contribution distance corresponding to the target pixel in the preset direction based on the detected pixel distance.

10. The method according to claim 9, further comprising:

determining a pixel in an occluded state in the lightmap, and adding an occlusion marker to the pixel in the occluded state in the lightmap, wherein calculating, based on the determining, a pixel distance between the target pixel and the occluded pixel detected in the direction, and determining a light contribution distance corresponding to the target pixel in the preset direction based on the detected pixel distance comprises:

calculating a pixel distance between the target pixel and the detected pixel with the occlusion marker; and determining, based on the calculated pixel distance, the light contribution distance corresponding to the target pixel in the preset direction.

11. The method according to claim 10, wherein the lightmap is obtained by performing two-dimensional splitting on a three-dimensional virtual model in a virtual scene in three-dimensional space, and the determining a pixel in an occluded state in the lightmap comprises:

correspondingly determining, for each pixel in the lightmap, from the virtual scene in the three-dimensional space, a geometric surface that intersects a plurality of rays starting from the pixel at the shortest distance; and determining the pixel in the occluded state from pixels in the lightmap based on a relationship between a direction of a normal of the pixel and a direction of a normal of the correspondingly determined geometric surface.

12. The method according to claim 1, wherein the performing, based on the light contribution parameter value and the light data of the reference pixel, noise reduction on light data recorded for the target pixel in the lightmap, to obtain a noise-reduced lightmap comprises:

determining, based on the light contribution parameter value of each reference pixel and the light data recorded for each reference pixel, total light contributed by reference pixels to the target pixel;

obtaining a combined light contribution parameter value, the combined light contribution parameter value being determined based on a sum of light contribution parameter values of the reference pixels; and performing, based on a ratio of the total light to the combined light contribution parameter value, noise reduction on the light data recorded for the target pixel in the lightmap, to obtain the noise-reduced lightmap.

13. The method of claim 1, wherein the obtaining a lightmap comprises:

determining, for each pixel in an initial lightmap, a pixel within a preset neighborhood range of the pixel as a neighborhood pixel of the pixel;

obtaining a brightness value for one or more pixels based on the initial lightmap;

determining a brightness range of the pixel based on the brightness value of each neighborhood pixel of the pixel;

obtaining a brightness value of the pixel; and adjusting, in a case that the brightness value of the pixel exceeds the brightness range, the brightness value of the pixel to be within a target brightness range, to obtain the lightmap.

14. A device, comprising:

a noise detection module, configured to obtain a lightmap; and determine, by using each pixel in the lightmap as a target pixel, a noise reduction reference region corresponding to the target pixel in the lightmap, the noise reduction reference region comprising a reference pixel for noise reduction reference;

a light module, configured to determine, for each reference pixel, a distance in three-dimensional space between the reference pixel and the target pixel; and determine a light contribution parameter value of the reference pixel to the target pixel based on the distance; and a noise reduction module, configured to obtain light data recorded for the reference pixel in the lightmap; and perform, based on the light contribution parameter value and the light data of the reference pixel, noise reduction on light data recorded for the target pixel in the lightmap, to obtain a noise-reduced lightmap.

15. The device of claim 14, wherein the device is further configured to produce a subsequent lightmap that is further noise-reduced.

16. The device of claim 15, wherein the noise reduction reference region is determined based on a sampling range of a first filter kernel of a previous round of noise reduction.

17. A non-transitory computer readable medium that contains computer instructions that, when executed by one or more computer processors causes those processors to perform actions comprising:

determining, by using each pixel in a lightmap as a target pixel, a noise reduction reference region corresponding to the target pixel in the lightmap, the noise reduction reference region comprising a reference pixel for noise reduction reference;

determining a distance between the reference pixel and the target pixel;

determining a light contribution parameter value of the reference pixel to the target pixel based on the distance;

obtaining light data recorded for the reference pixel in the lightmap;

reducing, based on the light contribution parameter value and the light data of the reference pixel, noise on light data recorded for the target pixel in the lightmap; and generating, based on the reducing, a noise-reduced lightmap.

18. The non-transitory computer readable medium of claim 17, further comprising instructions that cause the one or more processors to perform actions including generating a subsequent lightmap that is further noise-reduced.

19. The non-transitory computer readable medium of claim 17, wherein the instructions cause the one or more processors to determine the noise reduction reference region based on a sampling range of a first filter kernel of a previous round of noise reduction.

20. The non-transitory computer readable medium of claim 19, wherein the computer instructions cause the one or more processors to determine the light contribution parameter value based on the distance by:

obtaining at least one of a normal influence parameter value or a brightness influence parameter value, the normal influence parameter value being determined based on a normal of the target pixel and a normal of the reference pixel, and the brightness influence parameter value being determined based on brightness of the target pixel and brightness of the reference pixel; and determining the light contribution parameter value of the reference pixel to the target pixel based on the distance and at least one of the normal influence parameter value or the brightness influence parameter value.

* * * * *